United States Patent [19]

Shiomi et al.

[11] Patent Number: 5,784,137
[45] Date of Patent: Jul. 21, 1998

[54] LIQUID CRYSTAL DISPLAY DEVICE AND METHOD FOR PRODUCING THE SAME

[75] Inventors: Makoto Shiomi, Tenri; Shinji Yamagishi, Osaka; Tokihiko Shinomiya; Shuichi Kozaki, both of Nara; Kohichi Fujimori, Nabari, all of Japan

[73] Assignee: Sharp Kabushiki Kaisha, Osaka, Japan

[21] Appl. No.: 602,940

[22] Filed: Feb. 16, 1996

[30] Foreign Application Priority Data

Feb. 17, 1995 [JP] Japan .................. 7-029910
Aug. 7, 1995 [JP] Japan .................. 7-201216
Nov. 16, 1995 [JP] Japan .................. 7-298751

[51] Int. Cl.$^6$ ............ G02F 1/1333; G02F 1/1339; C09K 19/02
[52] U.S. Cl. .................. 349/88; 349/156; 349/183
[58] Field of Search ................ 349/88, 156, 188, 349/183

[56] References Cited

U.S. PATENT DOCUMENTS 5,305,126  4/1994  Kobayashi et al. ............ 349/183
5,612,803  3/1997  Yamada et al. ................ 349/188

FOREIGN PATENT DOCUMENTS 5-027 242   2/1993  Japan .
6-160 818   6/1994  Japan .
8-036 164   2/1996  Japan .
WO85-04262-A1  9/1985  WIPO .

OTHER PUBLICATIONS

H. Hasebe et al., "Properties of Novel UV–Curable Liquid Crystals and its Retardation Film," in *Conference Record of the 1994 Internat'l Display Research Conference*, pp. 161–164 (Monterey, CA, Oct. 1994).

*Primary Examiner*—William L. Sikes
*Assistant Examiner*—Tiep H. Nguyen
*Attorney, Agent, or Firm*—David G. Conlin; Peter F. Corless; Dike, Bronstein, Roberts & Cushman, LLP

[57] ABSTRACT

A liquid crystal display device includes substrates opposed to each other, a polymeric layer patterned into a predetermined pattern, and a liquid crystal layer at least partially surrounded by the polymeric layer. The polymeric layer and the liquid crystal layer are interposed between the substrates. The polymeric layer is at least partially formed by polymerizing a liquid crystalline polymerization precursor in a state where the molecules of the liquid crystalline polymerization precursor are aligned in a predetermined direction by an alignment regulating force of at least one of the substrates.

15 Claims, 8 Drawing Sheets

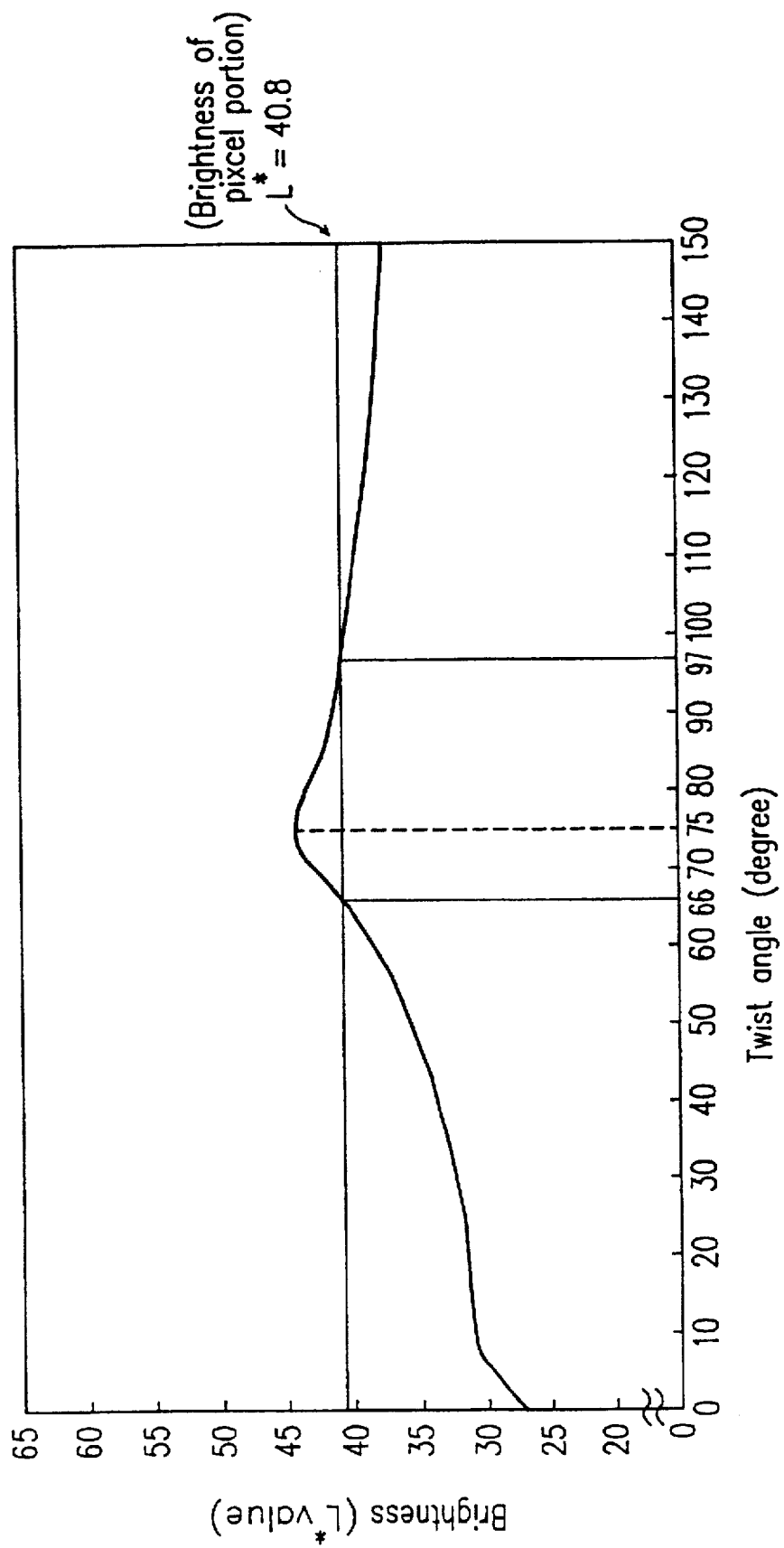

Setting of upper part of liquid crystal display device

Setting of lower part of liquid crystal display device

Rubbing direction on upper substrate

Rubbing direction on lower substrate

Alignment state of polymeric layer viewed from upper substrate

Alignment state of polymeric layer viewed from lower substrate (Alignment twisted 75° from top to bottom)

LIQUID CRYSTAL DISPLAY DEVICE AND METHOD FOR PRODUCING THE SAME

BACKGROUND OF THE INVENTION

1. Field of the Invention

The present invention relates to a liquid crystal display device and a method for producing the same. More specifically, the present invention relates to a liquid crystal display device including a liquid crystal layer and a polymeric layer having birefringence in the same orientation state as the liquid crystal layer and at least partially surrounding the liquid crystal layer, and a method for producing such a liquid crystal display device.

2. Description of the Related Art

At present, liquid crystal display devices of a variety of display modes are used. For example, as liquid crystal display devices utilizing an electro-optic effect, those in a twisted nematic (TN) mode, those in a super-twisted nematic (STN) mode, which use nematic liquid crystal, those in an electrically controlled birefringence (ECB) mode, and those in a ferroelectric liquid crystal (FLC) mode have been put into practice. In these modes, polarization is utilized so that a polarizing plate is generally required. As a method for improving a viewing characteristic of a liquid crystal display device using such a polarizing plate, a method for producing a complex material of a liquid crystal material and a polymeric material (hereinafter known as photocurable resin) by causing phase separation of a mixture of the liquid crystal material and the polymeric material is disclosed in Japanese Laid-Open Patent Publication No. 5-27242. Such phase separation can be effected by selectively controlling the intensity of light using a photomask or the like, when the photocurable resin is photopolymerized.

On the other hand, for liquid crystal display devices utilizing scattering of liquid crystal without using a polarizing plate, devices utilizing a dynamic scattering (DS) effect and a phase change (PC) effect have come into existence.

Further, as scattering type liquid crystal display devices requiring neither a polarizing plate nor an alignment treatment, those utilizing the birefringence of liquid crystal so as to electrically control a transparent state and an opaque state have been proposed. In such a liquid crystal display device, the refractive index of the liquid crystal molecule with respect to ordinary light is basically matched with the refractive index of a supporting medium. More specifically, in the liquid crystal display device, the transparent state is shown when the liquid crystal molecules are uniformly aligned in the direction of the electric field by application of a voltage, and the opaque state is shown under application of no voltage because of light scattering caused by the turbulence of the liquid crystal molecules. Such a scattering type liquid crystal display device is produced, for example, by mixing a liquid crystal material and a polymeric material such as a photocurable resin or a thermosetting resin, and then curing the polymeric material to cause phase separation of the liquid crystal material and the polymeric material, so as to form a liquid crystal droplet in the polymeric material, as disclosed in Japanese National Publication No. 61-502128.

Generally, brightness and contrast of a device are important factors for a liquid crystal display device. The liquid crystal display device satisfying the brightness and the contrast at the same time is ideal. However, the brightness is usually more important for a reflective type liquid crystal display device, and the contrast is more important for a transmissive type liquid crystal display device. In particular, in the reflective type liquid crystal display device which utilizes phase separation between a liquid crystal material and a polymeric material, especially, in the liquid crystal display device which utilizes a polymer matrix type in which a liquid crystal layer is surrounded by a polymeric layer in order to improve impact resistance and pressure resistance, a problem that the liquid crystal display device as a whole becomes dark due to the polymeric layer has been caused.

In order to solve such a problem, in Japanese Patent Application No. 6-172740, "A liquid crystal display device and a method for producing the same", a liquid crystal display device in which molecules of the polymeric layer are aligned in the same manner as those of the liquid crystal layer is proposed. However, there is no suggestion about specific means for forming and fixing the polymeric layer by the phase separation between the polymeric material and the liquid crystal material while the polymeric material having anisotropy remains aligned. In such a liquid crystal display device, it is difficult to form the polymeric layer while the polymeric material remains aligned, whereby it is difficult to obtain a bright liquid crystal display device. Further, since such a polymeric material having anisotropy lacks rigidity, it is difficult to obtain a liquid crystal display device excellent in impact resistance and pressure resistance.

As described above, the liquid crystal display devices conventionally used have a variety of problems.

SUMMARY OF THE INVENTION

A liquid crystal display according to the present invention includes substrates opposed to each other, a polymeric layer patterned into a predetermined pattern, and a liquid crystal layer at least partially surrounded by the polymeric layer, the polymeric layer and the liquid crystal layer being interposed between the substrates. The polymeric layer is at least partially formed by polymerizing a liquid crystalline polymerization precursor in a state where the molecules of the liquid crystalline polymerization precursor are aligned in a predetermined direction by an alignment regulating force of at least one of the substrates.

In one embodiment of the invention, the predetermined pattern is a matrix shape.

In another embodiment of the invention, a difference between a birefringence $\Delta n_1$ of the liquid crystalline polymerization precursor and a birefringence $\Delta n_2$ of a liquid crystal material forming the liquid crystal layer is less than $\pm 15\%$ of the birefringence $\Delta n_2$.

According to another aspect of the invention, a liquid crystal display device includes substrates opposed to each other, a polymeric layer patterned into a predetermined pattern, and a liquid crystal layer at least partially surrounded by the polymeric layer, the polymeric layer and the liquid crystal layer being interposed between the substrates. The polymeric layer is a multilayer including a resin layer having an optical anisotropy and a resin layer having no optical anisotropy, the resin layer having an optical anisotropy being formed by polymerizing a liquid crystalline polymerization precursor in a state where the molecules of the liquid crystalline polymerization precursor are aligned in a predetermined direction by an alignment regulating force of at least one of the substrates.

In one embodiment of the invention, a thickness of the resin layer having an optical anisotropy is 20% to 80% of a cell gap.

In another embodiment of the invention, the predetermined pattern is a matrix.

In still another embodiment of the invention, the predetermined pattern is a stripe shape matching a pattern of a portion in the substrates where electrodes are not formed, and the substrates are attached to each other so that the striped patterns are perpendicular to each other.

In yet another embodiment of the invention, the molecules of the resin layer having an optical anisotropy are aligned at a twist angle of 60° to 100°.

In one embodiment of the invention, a difference between a birefringence $\Delta n_1$, of the liquid crystalline polymerization precursor and a birefringence $\Delta n_2$ of a liquid crystal material forming the liquid crystal layer is less than ±15% of the birefringence $\Delta n_2$.

According to another aspect of the invention, a method for producing a liquid crystal display device including substrates opposed to each other, a polymeric layer patterned into a predetermined pattern, and a liquid crystal layer at least partially surrounded by the polymeric layer, the polymeric layer and the liquid crystal layer being interposed between the substrates, includes the step of polymerizing a liquid crystalline polymerization precursor to form a polymeric layer patterned into a predetermined pattern, in a state where the liquid crystalline polymerization precursor is previously disposed on at least one of the substrates, and the molecules of the liquid crystalline polymerization precursor are aligned in predetermined direction by an alignment regulating force of at least one of the substrates.

In one embodiment of the invention, the liquid crystalline polymerization precursor is cast to form a thin film, and the thin film is irradiated with light via a mask to be polymerized, so as to form the polymeric layer.

In another embodiment of the invention, the liquid crystalline polymerization precursor is printed in a predetermined pattern on the substrate, and then the precursor is polymerized, so as to form the polymeric layer.

According to another aspect of the invention, a method for producing a liquid crystal display device including substrates opposed to each other, a polymeric layer patterned into a predetermined pattern and including a resin layer having an optical anisotropy and a resin layer having no optical anisotropy, and a liquid crystal layer at least partially surrounded by the polymeric layer, the polymeric layer and the liquid crystal layer being interposed between the substrates, includes the steps of:

polymerizing a liquid crystalline polymerization precursor to form a resin layer having an optical anisotropy patterned into a predetermined pattern and having a thickness smaller than a cell gap, in a state where the liquid crystalline polymerization precursor is previously disposed on at least one of the substrates, and the molecules of the liquid crystalline polymerization precursor are aligned in a predetermined direction by an alignment regulating force of at least one of the substrates;

injecting a mixture containing a liquid crystal material forming the liquid crystal layer and a polymeric material having no optical anisotropy between a pair of substrates on at least one of which the resin layer having an optical anisotropy is formed, and causing phase separation between the liquid crystal material and the polymeric material in accordance with a pattern of the resin layer having an optical anisotropy; and allowing the resin layer having an optical anisotropy and a resin layer having no optical anisotropy formed of the polymeric material to be superposed so as to form the polymeric layer pattered into a predetermined pattern.

In one embodiment of the invention, the liquid crystalline polymerization precursor is cast to form a thin film, and the thin film is exposed to light via a mask to be polymerized, so as to form the resin layer having an optical anisotropy.

In another embodiment of the invention, the liquid crystalline polymerization precursor is printed in a predetermined pattern on the substrate, and then the precursor is polymerized, so as to form the resin layer having an optical anisotropy.

In still another embodiment of the invention, the molecules of the resin layer having an optical anisotropy are aligned at a twist angle of 60° to 100°.

In yet another embodiment of the invention, the resin layer having an optical anisotropy is formed by polymerizing the liquid crystalline polymerization precursor in a predetermined pattern, and then transferred onto the substrate.

In one embodiment of the invention, the molecules of the resin layer having an optical anisotropy are aligned at a twist angle of 60° to 100°.

According to another aspect of the invention, a liquid crystal display device includes substrates opposed to each other, a polymeric layer patterned into a predetermined pattern, and a liquid crystal layer at least partially surrounded by the polymeric layer, the polymeric layer and the liquid crystal layer being interposed between the substrates. The polymeric layer is at least partially formed by polymerizing a polymerization precursor in a state where the molecules of the polymerization precursor are aligned in a predetermined direction by an alignment regulating force of at least one of the substrates. The predetermined pattern of the polymeric layer matches a pattern of a surface treatment which is performed on the substrates.

In one embodiment of the invention, the surface treatment is performed by forming a thin film having surface energy different from the substrate surface on the surface of the substrate in accordance with a pattern of electrodes formed on the substrate.

In another embodiment of the invention, the polymerization precursor contains a liquid crystalline polymerization precursor and a non-liquid crystalline polymerization precursor.

In still another embodiment of the invention, a liquid crystal transition temperature of the polymerization precursor is lower by at least 20° C. than a transition temperature of a liquid crystal material forming the liquid crystal layer.

In yet another embodiment of the invention, a mixture of the polymerization precursor and a liquid crystal material forming the liquid crystal layer exhibits a two-phase region of liquid crystal phase and isotropic phase at temperatures in the range from 10° C. to 70° C.

In one embodiment of the invention, the non-liquid crystalline polymerization precursor is selected from the group consisting of an acrylate type polymerization precursor and a methacrylate type polymerization precursor.

In one embodiment of the invention, a difference between a birefringence $\Delta n_1$ of the polymerization precursor and a birefringence $\Delta n_2$ of a liquid crystal material forming the liquid crystal layer is less than ±15% of the birefringence $\Delta n_2$.

According to another aspect of the invention, a method for producing a liquid crystal display device including substrates opposed to each other, a polymeric layer patterned into a predetermined pattern, and a liquid crystal layer at least partially surrounded by the polymeric layer, the polymeric layer and the liquid crystal layer being interposed between the substrates, includes the steps of:

forming a thin film in a predetermined pattern on at least one of the substrates, the thin film having a surface energy different from the substrate surface;

injecting a mixture containing a liquid crystal material forming the liquid crystal layer and a polymerization precursor forming the polymeric layer between a pair of substrates on at least one of which the thin film is formed;

forming the liquid crystal layer by causing phase separation between the liquid crystal material and the polymerization precursor in accordance with a pattern of the thin film; and forming the polymeric layer patterned into a predetermined pattern by polymerizing the phase-separated polymerization precursor, in a state where the molecules of the polymerization precursor are aligned in a predetermined direction by an alignment regulating force of at least one of the substrates.

According to another aspect of the invention, a liquid crystal display device includes substrates opposed to each other, a polymeric layer patterned into a predetermined pattern, and a liquid crystal layer at least partially surrounded by the polymeric layer, the polymeric layer and the liquid crystal layer being interposed between the substrates. The polymeric layer is at least partially formed by polymerizing a polymerization precursor, in a state where the molecules of the polymerization precursor are aligned in a predetermined direction by an alignment regulating force of at least one of the substrates. The polymerization precursor includes at least a component having a negative dielectric anisotropy, and the polymerization precursor has the negative dielectric anisotropy as a whole.

In one embodiment of the invention, a mixture of the polymerization precursor and a liquid crystal material forming the liquid crystal layer exhibits a two-phase region of liquid crystal phase and isotropic phase at temperatures in the range from 10° C. to 70° C., and the mixture has a positive dielectric anisotropy as a whole.

In another embodiment of the invention, a difference between a birefringence $\Delta n_1$ of the polymerization precursor and a birefringence $\Delta n_2$ of a liquid crystal material forming the liquid crystal layer is less than ±15% of the birefringence $\Delta n_2$.

According to another aspect of the invention, a method for producing a liquid crystal display device including substrates opposed to each other, a polymeric layer patterned into a predetermined pattern, and a liquid crystal layer at least partially surrounded by the polymeric layer, the polymeric layer and the liquid crystal layer being interposed between the substrates, includes the steps of:

injecting a mixture between a pair of substrates on which electrodes are formed in a predetermined pattern, the mixture containing a liquid crystal material forming the liquid crystal layer and a polymerization precursor at least including a component having a negative dielectric anisotropy and having the negative dielectric anisotropy as a whole;

applying an electric field to the electrodes to cause phase separation between the liquid crystal material and the polymerization precursor in accordance with a pattern of the electrodes, so as to form the liquid crystal layer; and polymerizing the phase-separated polymerization precursor, in a state where the molecules of the polymerization precursor are aligned in a predetermined direction by an alignment regulating force of at least one of the substrates, so as to form the polymeric layer patterned into a predetermined pattern.

Thus, the invention described herein makes possible the advantages of (1) providing a liquid crystal display device excellent in brightness of display, (2) providing a bright liquid crystal display device excellent in impact resistance and pressure resistance, (3) providing a liquid crystal display device excellent in reproducibility of tone, (4) providing a simplified method for producing such s liquid crystal display device, and (5) providing a method for producing a liquid crystal display device excellent in yield of production.

These and other advantages of the present invention will become apparent to those skilled in the art upon reading and understanding the following detailed description with reference to the accompanying figures.

BRIEF DESCRIPTION OF THE DRAWINGS

FIG. 10 is a graph showing the relations between a twist angle and brightness of a resin layer having an optical anisotropy in a liquid crystal display device according to the present invention.

DESCRIPTION OF THE PREFERRED EMBODIMENTS

Embodiment 1

Figure 1:
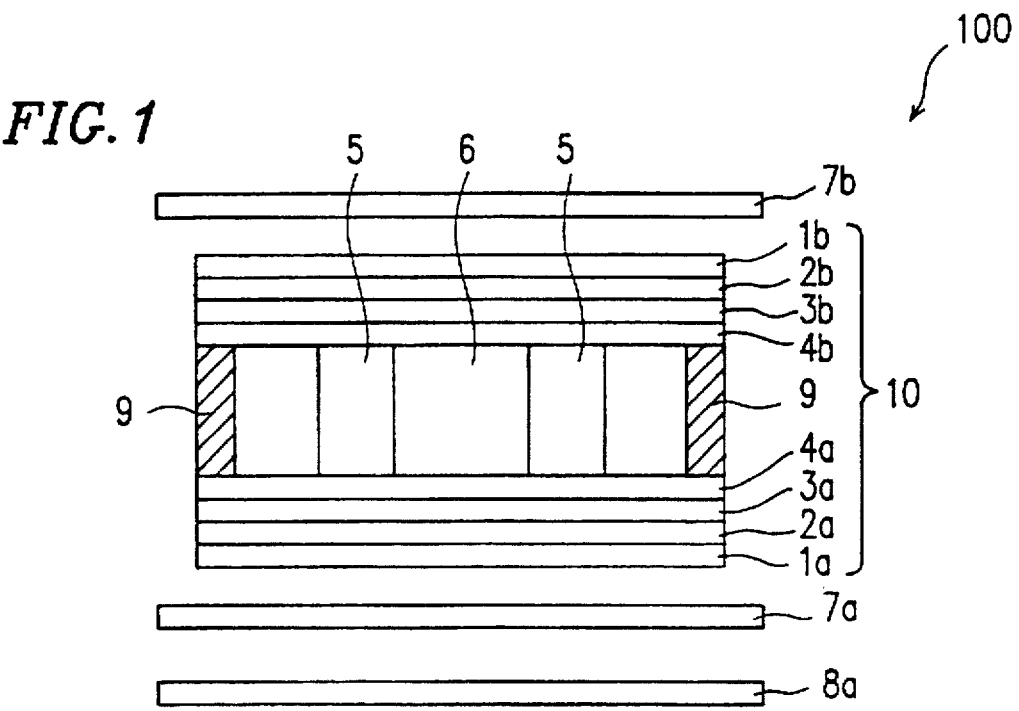
FIG. 1 is a schematic cross sectional view showing an example of a liquid crystal display device according to the present invention.

FIG. 1 is a schematic cross sectional view showing a preferred example of a liquid crystal display device according to the present invention. A liquid crystal display device 100 includes a liquid crystal cell 10, polarizing plates 7a and 7b disposed outside the liquid crystal cell, and a reflecting plate 8a disposed outside one of the polarizing plates. The liquid crystal cell 10 includes a pair of substrates 1a and 1b opposed to each other, and pixel electrodes 2a and 2b patterned into a predetermined pattern on the substrates 1a and 1b. If necessary, electrical insulating films 3a and 3b are provided covering the pixel electrodes 2a and 2b. Alignment films 4a and 4b are provided on the electrical insulating films 3a and 3b, respectively. A polymeric layer 5 patterned into a predetermined pattern and a liquid crystal layer 6 working as a display medium at least partially surrounded by the polymeric layer 5, are interposed between the substrates 1a and 1b. The substrates 1a and 1b are attached to each other and sealed by a sealant at the peripheral portion.

A rigid material such as glass, plastic and the like can be used for the substrates 1a and 1b. A thickness of the substrates is preferably 0.2 to 2.0 mm. When the thickness is less than 0.2 mm, a processing is likely to be difficult. When the thickness is more than 2.0 mm, the surface reflection is likely to be caused. In addition, since a weight of the liquid crystal display device is increased, a thickness more than 2.0 mm is not preferable for practical use.

ITO (Indium Tin Oxide), an SnO alloy can be used for the pixel electrodes 2a and 2b. The pixel electrodes 2a and 2b are formed on the substrates 1a and 1b in a desired thickness by deposition, sputtering or the like, and patterned into a desired pattern by a technique such as etching and photolithography. The pixel electrodes 2a and 2b are, for example, formed in the following manners. ITO is deposited so as to form striped electrodes 2a and 2b of a predetermined width with a predetermined interval by etching. The pixel electrodes 2a and 2b are formed in such a manner that they are perpendicular to each other viewed from the normal direction with respect to the substrates 1a and 1b. The portions where the pixel electrodes 2a and 2b are overlapped work as pixels contributing to display an image. A width of the pixel electrodes is preferably 30 to 400 μm. An interval between the pixel electrodes is preferably 10 to 30 μm. A thickness of the pixel electrodes is preferably 300 to 2000 Å.

A known electrical insulating material such as $SiO_2$ and $SiN_x$ can be used for the electrical insulating films 3a and 3b. The electrical insulating films 3a and 3b are formed in a desired thickness by deposition, sputtering or the like. A thickness of the electrical insulating films is preferably 500 to 10,000 Å.

A polyimide resin or the like can be used for the alignment films 4a and 4b. The alignment films can be formed by a technique such as flexography. A thickness of the alignment films is preferably 300 to 1000 Å. Preferably, the alignment films are subjected to an alignment treatment such as a rubbing treatment using a nylon fabric. For example, the rubbing treatment is conducted in order that molecules of the liquid crystal are aligned in a TN orientation or an STN orientation where the striped pixel electrodes 2a and 2b are perpendicular to each other. Further, the alignment treatment can also be conducted in order to adjust a phase difference in the polymeric layer.

The polymeric layer 5 can be formed into a desired pattern by polymerizing a liquid crystalline polymerization precursor in a state where molecules of the liquid crystalline polymerization precursor are aligned in a predetermined direction by an alignment regulating force of the substrates.

The liquid crystalline polymerization precursor is a compound having a portion exhibiting liquid crystallinity (hereinafter, referred to as a liquid crystalline portion) and a polymerizable portion (hereinafter, referred to as a monomer portion). The monomer portion is preferably an acrylate moiety. It is preferred that the liquid crystalline polymerization precursor predominantly exhibits a nematic phase in the vicinity of room temperature. Typical examples of such a compound include the compounds represented by the following formulae:

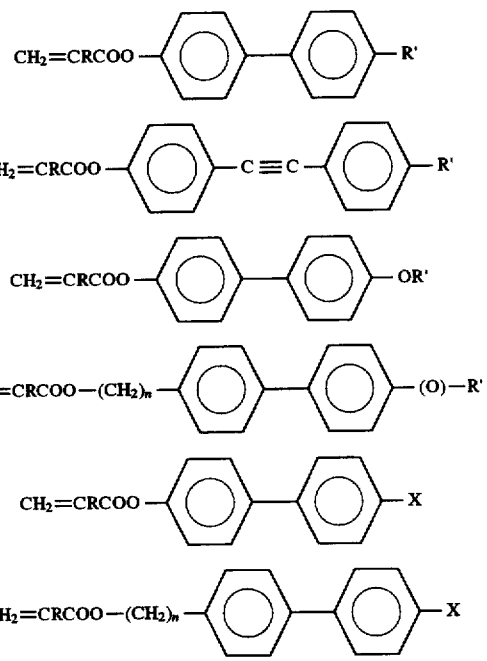

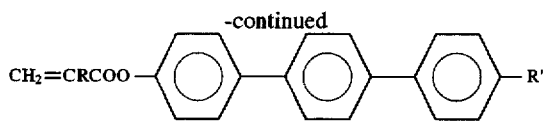
-continued where R is a hydrogen atom or a methyl group; R' is a non-substituted or fluorine-substituted linear alkyl group, branched alkyl group or alkenyl group, having one to eight carbon atoms; X is F, Cl, CN, $CF_3$, $CH_2F$, $CHF_2$ or $OCF_3$; n is 0, 1, 2, 3, or 4; and Cl or F can be substituted for at least a part of the hydrogen atom of the aromatic ring.

Such a compound can be synthesized in accordance with, for example, "Synthesis and Phase Behaviour of Liquid Crystalline Polyacrylates" by M. Portugall, H. Ringsdorf and R. Zentel; Macromol. Chem., vol 183, 1982, pp 2311–2321.

Preferably, a fluorine atom, a chlorine atom, a monofluoromethyl group, a difluoromethyl group, a trifluoro-methyl group or the like can be further introduced into such a compound. Refractive index, transition temperature and the like can be suitably adjusted by substituting such an atom or group.

The liquid crystalline polymerization precursor can be preferably polymerized by the radiation of ultraviolet rays (hereinafter, referred to as UV rays), so as to form a polymeric layer in a desired pattern. A high pressure mercury lamp, a metal halide lamp or the like can be used for the light source of the UV rays. As a method for forming a desired pattern, after a thin film is formed by casting a liquid crystalline polymerization precursor, the thin film can be selectively irradiated with UV rays using a photomask or the like. Alternatively, after the liquid crystalline polymerization precursor is printed in a desired pattern, the entire surface can be irradiated with the UV rays. In view of adhesiveness between the liquid crystalline polymerization precursor and the substrates and the control to thickness, the method of forming the thin film by casting is preferable. The UV rays are radiated preferably at an illuminance of 5 to 12 $mW/cm^2$ for 30 to 90 seconds. In the case where the UV rays are insufficiently radiated in the quantity, the precursor is insufficiently polymerized. When the UV rays are radiated in too large a quantity, particularly, in the case where the UV rays are selectively radiated using a photomask, the precursor in an undesired portion may be polymerized. As a result, a polymeric layer with a desired pattern may not be obtained. Moreover, the temperature during the radiation of UV rays is preferably lower than the transition temperature of the liquid crystalline polymerization precursor by at least 5° C. If the UV rays are radiated at a temperature higher than this temperature, the liquid crystalline polymerization precursor may transit to an isotropic phase by the temperature being raised during the radiation. As a result, the precursor may not be polymerized in a desired alignment state.

An addition agent such as a photopolymerization initiator, a chiral agent or the like can be added to the liquid crystalline polymerization precursor, if necessary. A phase difference in a polymeric layer can be adjusted by adjusting an amount of addition of the chiral agent. For example, as the photopolymerization initiator, Irugacure 651 (manufactured by Ciba Geigy Corporation) can be used, and as the chiral agent, S-811 (manufactured by Merck & Co., Inc.) can be used.

The molecules of the polymeric layer 5 are preferably aligned at a twist angle of about 60° to about 100°. By the twisted alignment at such an angle, a nonpixel portion can be brighter than a pixel portion. As a result, the liquid crystal display device becomes bright as a whole.

A known material can be used for the liquid crystal material forming the liquid crystal layer 6, provided that it is an organic mixture exhibiting liquid crystalline behavior in the vicinity of room temperature. The type of the liquid crystal can be nematic liquid crystal, cholestic liquid crystal, smectic liquid crystal, ferroelectric liquid crystal, discotic liquid crystal and the like. The liquid crystal of these types can be used alone or in combination. An operation mode for driven liquid crystal can be any mode such as TN, STN, ECB, FLC and the like, provided that birefringence and polarization are utilized. As the liquid crystal material, for example, MLC-6069 and ZLI-4427 (manufactured by Merck & Co., Inc.) can be used. A chiral agent can be added to the liquid crystal material, if necessary.

The polarizing plates 7a and 7b, and the reflecting plate 8a are not particularly limited. For example, a generally used reflecting plate obtained by depositing aluminum, silver or the like on the substrate can be used for the reflecting plate 8a.

Generally, the liquid crystal display device 100 can be produced in such a manner that a polymeric layer is first formed, and a liquid crystal layer is then obtained by injecting a liquid crystal material. A preferred example of such a method for producing the liquid crystal display device is as follows.

A pixel electrode 2a, an electrical insulating film 3a, and an alignment film 4a are formed on a substrate 1a in this order to obtain an electrode substrate. On the other hand, an alignment film 4c is formed on a substrate 1c to obtain a substrate for UV ray radiation. The alignment films 4a and 4c are preferably subjected to an alignment treatment such as a rubbing treatment.

Figure 2:
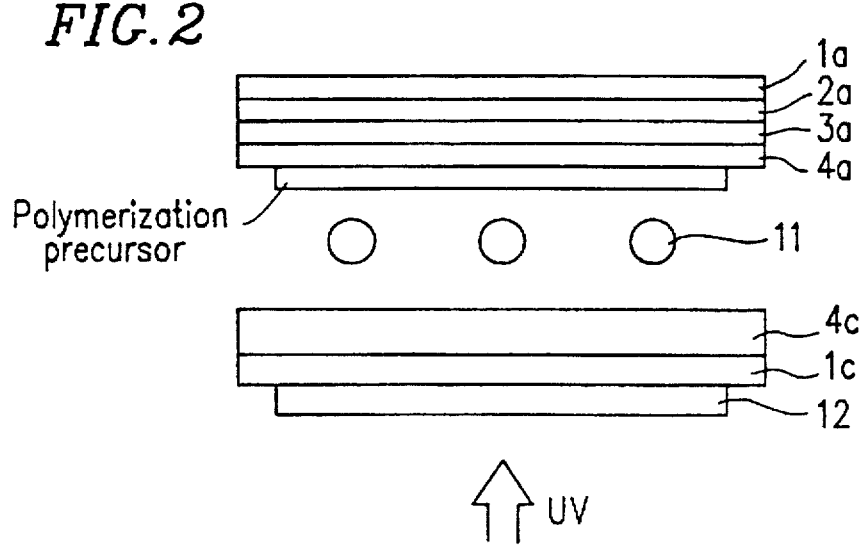
FIG. 2 is a schematic view showing a preferred example of a process for forming a polymeric layer in a method for producing the liquid crystal display device according to the present invention.

Next, as shown in FIG. 2, a liquid crystalline polymerization precursor is disposed on the electrode substrate by a casting method or the like. A thickness of the disposed liquid crystalline polymerization precursor is preferably 2 to 6 μm. Further, in the case where a polymeric layer aligned in a TN orientation is to be obtained, the electrode substrate and the substrate for UV ray radiation are attached to each other via spacers 11 so that the directions of alignment treatments to the alignment films 4a and 4b are perpendicular to each other. A liquid crystal layer formed of a polymerization precursor in a satisfactory TN orientation can be obtained by attaching the substrates so that the directions of the alignment treatments to the alignment films are perpendicular. A diameter of the spacers 11 can be varied depending on uses, but preferably 2 to 6 μm.

Further, as shown in FIG. 2, a photomask 12 is disposed outside the substrate for UV ray radiation, and the UV rays are radiated via the photomask 12 at a predetermined illuminance for a predetermined period of time. A material for the photomask is not particularly limited. A shape of the photomask can be varied depending on a desired pattern of the polymeric layer, but it is typically a matrix shape, so that the portion irradiated with the UV rays matches the non-pixel portion of the liquid crystal display device.

After the UV ray radiation, the substrate for UV ray radiation is peeled off and removed from the electrode substrate. The substrate for UV ray radiation is preferably subjected to a surface treatment with a release agent or the like. The surface treatment facilitates the separation of the substrate for UV ray radiation from the electrode substrate to a great extent. Next, the electrode substrate is cleaned by a predetermined solvent so as to obtain a substrate where the polymeric layer 5 is formed in a desired pattern. As the solvent used for cleaning, an alcohol type solvent such as ethanol and isopropanol; a hydrocarbon type solvent such as toluene and hexane and the like are used depending on the structure of the polymerization precursor. The period of time for cleaning can be varied depending on the type of the solvent, but preferably 30 seconds to 1 minute. By suitably selecting the solvent and the period of time for cleaning, the polymeric layer in a desired alignment state can be obtained in a desired pattern without adversely influencing the alignment treatment to the substrate (i.e., alignment of the liquid crystal molecules of the liquid crystal layer).

Next, a liquid crystal material is disposed on the electrode substrate on which the polymeric layer is formed, and evacuation is effected to reach a vacuum. At this point, a chiral agent is preferably added to the liquid crystal material so that the molecules of the liquid crystal material are aligned at a predetermined twist angle and at a predetermined pitch. Further, the electrode substrate on which the liquid crystal material is disposed and the counter electrode substrate on which pixel electrodes, an electrical insulating film and an alignment film are formed in this order are attached to each other and sealed via a sealant so that the pixel electrodes are perpendicular, viewed from the normal direction with respect to the substrates. Thus, a liquid crystal cell is obtained.

The liquid crystal material can also be injected between the substrates after the electrode substrate on which the polymeric layer is formed and the counter substrate are attached to each other.

Finally, polarizing plates are disposed outside the liquid crystal cell, and a reflecting plate is further disposed outside one of the polarizing plates. Thus, a liquid crystal display device is obtained.

A mechanism by which a polymeric layer in a desired alignment state is formed by polymerization of a liquid crystalline polymerization precursor will be described with reference to FIGS. 3A through 3D.

Figure 3A:
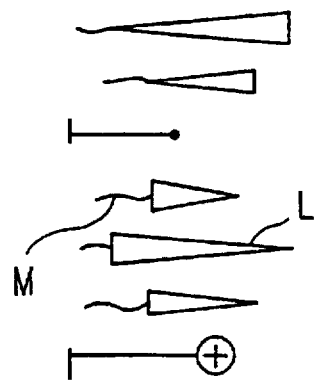
FIGS. 3A and 3B are schematic views showing alignment states before polymerization of molecules of a liquid crystalline polymerization precursor used in the present invention.
Figure 3B:
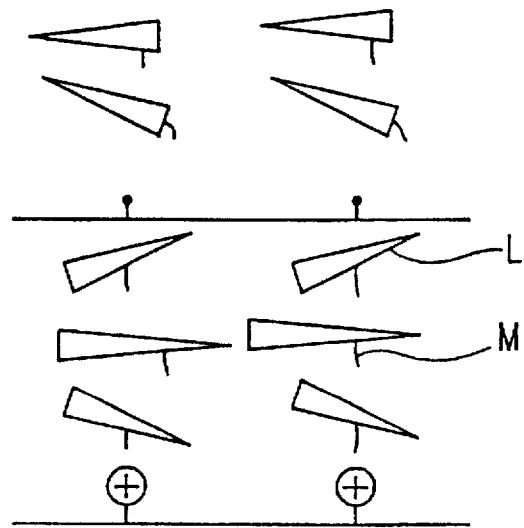
Figure 3C:
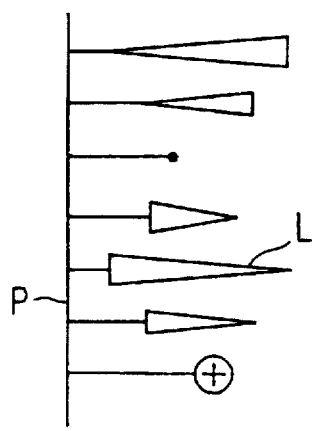
FIGS. 3C and 3D are schematic views showing alignment states after polymerization of the molecules of the liquid crystalline polymerization precursor.
Figure 3D:
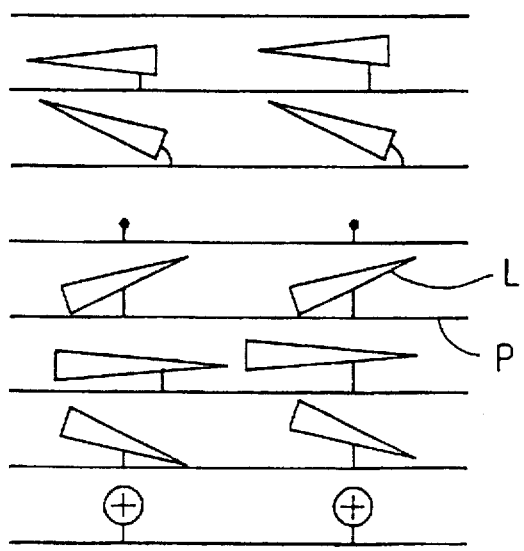

FIGS. 3A and 3B are schematic views showing alignment states of molecules of a liquid crystalline polymerization precursor before polymerization. FIGS. 3C and 3D are schematic views showing alignment states of the molecules of the liquid crystalline polymerization precursor after polymerization. As shown in FIGS. 3A and 3B, the liquid crystalline polymerization precursor has a monomer portion M and a liquid crystalline portion L. Since the molecules of the liquid crystalline polymerization precursor before polymerization are predominantly occupied by the liquid crystalline portion, the liquid crystalline polymerization precursor exhibits substantially the same characteristics as ordinary nematic liquid crystal. As a result, an arbitrary orientation of the molecules such as a TN mode and an STN mode can be easily obtained by adjusting an alignment treatment to a substrate and a pitch thereof. More specifically, as shown in FIGS. 3A and 3B, in the liquid crystalline polymerization precursor before polymerization, the liquid crystalline portion of the precursor molecules can be aligned at a predetermined twist angle in the direction of the thickness of the liquid crystal display device. It is to be understood that although actual liquid crystalline portion L is stick-shaped, it is asymmetrically expressed for the sake of clarification of the twist state.

When the liquid crystalline polymerization precursor is polymerized, only the monomer portion M is polymerized so as to form a polymer chain P, as shown in FIGS. 3C and 3D. The monomer portion M can be polymerized in a direction perpendicular to the substrate, as shown in FIG. 3C, and in a direction parallel to the substrate, as shown in FIG. 3D. However, the alignment states of the liquid crystalline portion L of the precursor molecules are not virtually different between before and after the polymerization. This is because the monomer portion M is not moved because of the regulation by the liquid crystalline portion L, but polymerized with another monomer portion surrounding the monomer portion M, due to the size and the rigidity. As a result, since the liquid crystalline polymerization precursor is polymerized while maintaining an alignment state of the liquid crystalline portion, a polymeric layer having a desired liquid crystal alignment state can be formed.

Since the polymeric layer formed as described above can have birefringence in the same state as the liquid crystal layer, a transmittance of the polymeric layer is significantly close to that of the liquid crystal layer. Accordingly, the non-pixel portion becomes as bright as the pixel portion. As a result, the liquid crystal display device becomes bright as a whole.

On the other hand, even if a non-liquid crystalline polymerization precursor simply having birefringence (i.e., a compound which functions as a polymeric liquid crystal after polymerization, but does not exhibit liquid crystallinity as a precursor) is polymerized so as to form a polymeric layer, the liquid crystal display device is not rendered bright. This is because an alignment state of the molecules of the non-liquid crystalline polymerization precursor before polymerization is isotropic, so that a desired alignment state cannot be obtained in the polymeric layer formed by the polymerization. Therefore, an alignment treatment to the polymeric layer formed by the polymerization is required. However, such an alignment treatment is extremely difficult. In the case where the polymeric layer is to be formed in a desired pattern, the alignment treatment is even more difficult. As a result, it is extremely difficult to form a polymeric layer having a desired alignment state. Accordingly, it is difficult to obtain a bright liquid crystal display device.

Embodiment 2

Figure 4:
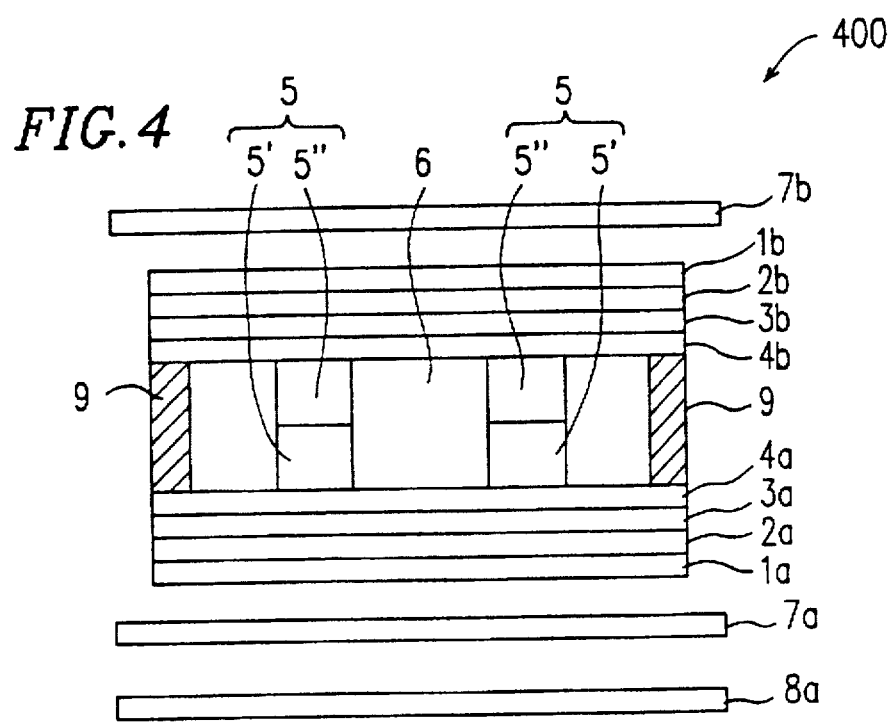
FIG. 4 is a schematic cross sectional view showing another example of the liquid crystal display device according to the present invention.

FIG. 4 is a schematic cross sectional view showing another example of a liquid crystal display device according to the present invention. In a liquid crystal display device 400, a polymeric layer 5 is a multilayer comprising a resin layer 5' having an optical anisotropy and a resin layer 5" having no optical anisotropy.

In the same manner as in Embodiment 1, the resin layer 5' having an optical anisotropy is formed in a predetermined pattern by polymerizing a liquid crystalline polymerization precursor in a state where the molecules thereof are aligned in a predetermined direction by an alignment regulating force of the substrates.

A thickness of the resin layer 5' having an optical anisotropy is preferably 20% to 80% of the cell gap (the distance between the alignment films 4a and 4b), and more preferably 40% to 70% of the cell gap. By setting the thickness of the resin layer 5' having an optical anisotropy in such a range, it is possible to inject a liquid crystal material/polymeric material composition between the substrates by an ordinary injection process such as a vacuum injection method, and cause phase separation between the liquid crystal material and the polymeric material so as to form the resin layer 5" having no optical anisotropy in a predetermined position (in this case, by forming the resin layer 5" having no optical anisotropy in the gap between the resin layer 5' having an optical anisotropy and the substrates). When the thickness of the resin layer 5' having an optical anisotropy exceeds 80% of the cell gap, it is likely to be difficult to inject the liquid material/polymeric material composition between the substrates.

Preferably, the molecules of the resin layer 5' having an optical anisotropy are aligned at a twist angle of about 60° to 100°. By such an alignment, the nonpixel portion can be brighter than the pixel portion. As a result, the liquid crystal display device becomes bright as a whole.

The resin layer 5" having no optical anisotropy is formed by causing phase separation between the liquid crystal material and the polymeric material. As the polymeric material, a photocurable resin, a thermosetting resin or the like can be used. The photocurable resin is preferable in that a resin layer can be easily formed in a desired pattern. The photocurable resin can be obtained by polymerizing a photocurable monomer by a known method. Examples of the photocurable monomer include acrylic acid, methacrylic acid, ester thereof, and halides thereof; each of which contains an alkyl group, an aryl group and a cycloalkyl group including three or more carbon atoms.

An example of a method for forming the resin layer 5" having no optical anisotropy will be described only in terms of a characteristic process (a process which is not particularly specified is the same as Embodiment 1).

Two pairs of electrode substrate and substrate for UV ray radiation are prepared. A liquid crystalline polymerization precursor is disposed on each of the electrode substrates, and the electrode substrates and the substrates for UV ray radiation are attached to each other via spacers. At this point, a diameter of the spacers is preferably slightly smaller than the cell gap of the liquid crystal display device to be obtained (for example, in the case where the cell gap is 5 µm, a diameter of the spacer is about 3 µm). Next, UV rays are radiated via a photomask at a predetermined illuminance for a predetermined period of time, so as to form a resin layer having an optical anisotropy in a stripe shape matching the pattern of the pixel electrodes. The pair of the substrates on which the striped resin layers are formed are attached to each other via the spacers so that the resin layers having an optical anisotropy on one substrate are perpendicular to those on the other substrates, viewed from the normal direction with respect to the substrates. At this point, since the diameter of the spacers is equal to the cell gap, the substrates are attached in a state where the portion on which the resin layers overlap is crushed.

Alternatively, a liquid crystalline polymerization precursor is disposed on a pair of substrates which have been subjected to a suitable alignment treatment, and the pair of substrates are attached to each other via spacers. At this time, the diameter of the spacers is set in the same manner as described above. Next, UV rays are radiated via a photomask at a predetermined illuminance for a predetermined period of time so as to form a resin layer having an optical anisotropy in a stripe shape matching a pattern of a portion where the pixel electrodes are not formed. One of the substrates is peeled off to obtain a substrate on which the resin layer having an optical anisotropy is formed in a stripe shape matching the pattern of the portion where the pixel electrodes are not formed. The obtained substrate is opposed to the electrode substrate so that the portion where the pixel electrodes are not formed matches the pattern of the resin layer having an optical anisotropy, and the substrates are attached to each other with pressure. Then, a heating treatment is performed so as to transfer the resin layer having an optical anisotropy on the electrode substrate. The pressure for the attachment is preferably 0.5 to 5 kg/cm². The temperature of the heating treatment is preferably 60° C. to 80° C. The period of time of the heating treatment is preferably 1 to 2 hours. Subsequently, the pair of the electrode substrate on which the resin layer having an optical anisotropy is formed are attached to each other in the same manner as described above.

Next, a mixture of a liquid crystal material and a polymeric material is injected between the attached substrates by a known method. The mixture is heated to a temperature higher than a temperature at which the liquid crystal material in the mixture transits into isotropic liquid. After the mixture is irradiated with UV rays at this temperature, the mixture is slowly cooled to a temperature lower than the transition temperature of the liquid crystal material, so as to cause phase separation between the liquid crystal material and the polymeric material. The heating temperature can be varied depending on the transition temperature of the liquid crystal material, but preferably 80° to 110° C. An illuminance of the UV rays is preferably 5 to 12 mW/cm², and radiation time is preferably 120 to 240 seconds. The UV rays can be radiated on the entire surface, or selectively radiated on a desired portion. The cooling rate is preferably 3° to 15° C./h. By performing heating, UV ray radiation and cooling under these conditions, it is possible to cause phase separation between the liquid crystal material and the polymeric material in a state where the mobilities of the molecules of the liquid crystal material and the polymeric material are significantly great. As a result, a clear phase separation between the liquid crystal material and the polymeric material is effected. In addition, the phase-separated polymeric material concentrates in the portion where the resin layer having an optical anisotropy is formed because of a satisfactory wettability with the resin layer. Therefore, a resin layer having no optical anisotropy is formed between the resin layer having an optical anisotropy and the substrate. Thus, the resin layer having an optical anisotropy and the resin layer having no optical anisotropy are superposed to form a polymeric layer.

Since the resin layer having no optical anisotropy formed as described above is remarkably rigid, the entire liquid crystal display device is excellent in rigidity, impact resistance, and pressure resistance. Moreover, since the resin layer having no optical anisotropy and the resin layer having an optical anisotropy are superposed, the brightness of the entire liquid crystal display device is satisfactorily maintained.

Embodiment 3

Figure 5:
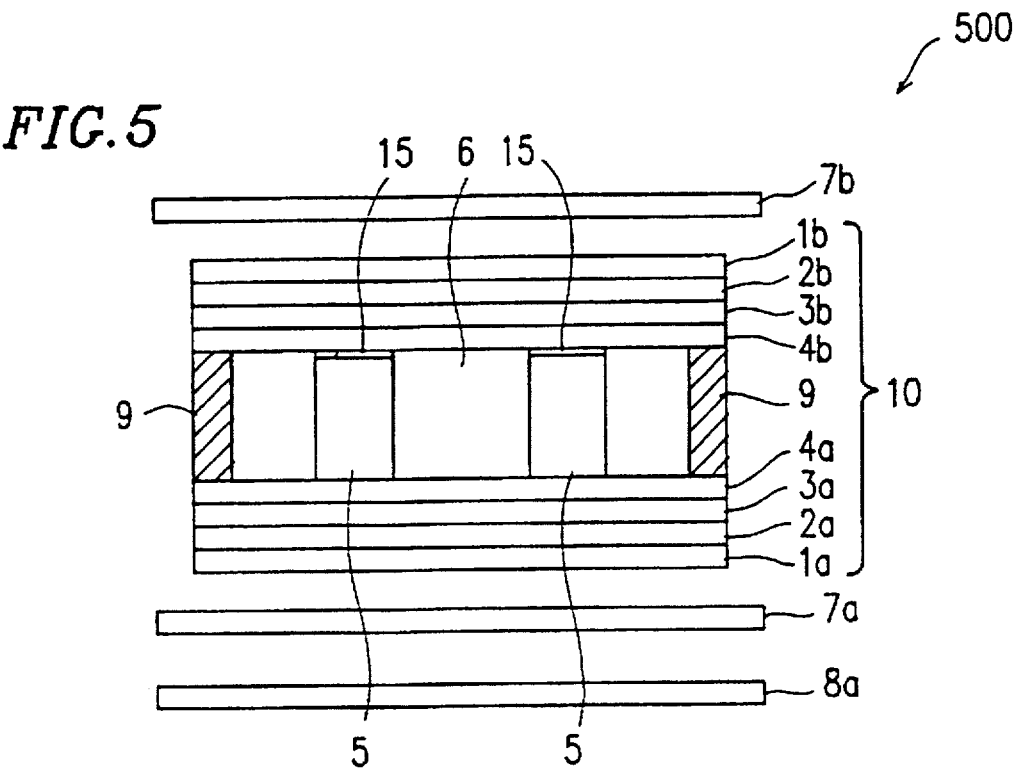
FIG. 5 is a schematic cross sectional view showing still another example of the liquid crystal display device according to the present invention.

FIG. 5 is a schematic cross sectional view showing still another example of a liquid crystal display device according to the present invention. In a liquid crystal display device 500, at least part of a polymeric layer 5 can be formed into a desired pattern by polymerizing a polymerization precursor in a state where molecules of the polymerization precursor are aligned in predetermined direction by the alignment regulating force of a substrate. Further, in the liquid crystal display device 500, a surface treatment is performed in a predetermined portion of the substrate 1a and/or 1b (i.e., the alignment films 4a and/or 4b) so as to form a portion having a surface energy different from that of the substrate surface. For example, the liquid crystal display device 500 includes a surface improving layer 15 having a surface energy different from that of the substrate surface (i.e., the surface of the alignment film) in a predetermined portion on the substrates 1a and/or 1b (i.e., the alignment films 4a and/or 4b).

Preferably, the polymerization precursor includes a liquid crystalline polymerization precursor and a non-liquid crystalline polymerization precursor. The liquid crystalline polymerization precursor has been described in Embodiment 1. Examples of the non-liquid crystalline polymerization precursor include acrylate, methacrylate, and styrene. In view of polymerizability, compatibility with a liquid crystal material forming a liquid crystal layer, and heat stability; a monofunctional or bifunctional acrylate or methacrylate is preferable. The content of the non-liquid crystalline polymerization precursor in the polymerization precursor is preferably more than 0 and equal to or less than 20% by weight, and more preferably 2 to 10% by weight. By allowing the non-liquid crystalline polymerization precursor to be contained in the polymerization precursor, the compatibility between the polymerization precursor and the liquid crystal material forming the liquid crystal layer is lowered. Therefore, the phase separation between the polymerization precursor and the liquid crystal material can be easily caused, thereby enabling a polymeric layer to be formed only by the phase separation. As a result, since this fact eliminates a need that the polymeric layer has been previously formed, a process for producing a liquid crystal display device is considerably simplified. When the content of the non-liquid crystalline polymerization precursor in the polymerization precursor exceeds 20% by weight, the liquid crystallinity of the polymerization precursor is lowered too much. Thus, a polymeric layer of a desired alignment state is unlikely to be formed.

It is preferred that the liquid crystal transition temperature of the polymerization precursor is sufficiently lower than that of the liquid crystal material forming the liquid crystal layer. This enables the phase separation between the polymerization precursor and the liquid crystal material to be distinctly effected. As a result, a liquid crystal display device having an excellent display characteristic can be obtained. More specifically, the liquid crystal transition temperature of the polymerization precursor is lower by at least 20° C. than that of the liquid crystal material forming the liquid crystal layer, and more preferably lower by at least 30° C.

Further, a mixture of the polymerization precursor and the liquid crystal material preferably exhibits a two-phase region of a liquid crystal phase and an isotropic phase in as wide a range of the temperature as possible. More specifically, it is preferred that the mixture exhibits the two-phase region in the range from 10° C. to 40° C., and more preferably from 15° C. to 25° C. By allowing the mixture of the polymerization precursor and the liquid crystal material to exhibit the two-phase region in a wide range of the temperature, the phase separation between the polymerization precursor and the liquid crystal material can be effected in a wide range of temperatures. Therefore, constraints by temperature during a producing process are considerably alleviated, thus simplifying the process for producing the liquid crystal display device.

Examples of materials used for the surface improving layer 15 include a resist material such as an acrylic type resist and a rubber type resist; an organic polymeric material such as polyimide and polyester; and silane type coupling material. These materials are preferably transmissive, in order that the polymerization precursor can be sufficiently polymerized to form a desired polymeric layer. Although these materials can be suitably selected depending on wettability with the polymerization precursor (in particular, non-liquid crystalline polymerization precursor), in the case where an acrylate or methacrylate resin is used as the non-liquid crystalline polymerization precursor, the resist material is preferable, and the acrylic type resist is more preferable.

The surface improving layer, for example, can be formed by first forming a film of a desired thickness by spin-coating and then patterning the film into a desired pattern by etching. The thickness of the surface improving layer is preferably 500 to 8000 Å. The pattern of the surface improving layer can be varied depending on the objective, but typically a matrix shape matching a non-pixel portion.

Examples of other techniques for varying the surface energy on the substrate than the technique of forming the surface improving layer include sputtering, electron beam, rubbing and steam exposure.

Such a liquid crystal display device 500 is produced by forming a liquid crystal phase only by the phase separation between the polymerization precursor and the liquid crystal material without previously forming a polymeric layer. A specific example of such a producing method is as follows.

An acrylic type resist is spin-coated on a substrate on which pixel electrodes, an electrical insulating film and an alignment film are formed in this order, so as to form a film of a thickness of 0.5 µm. Then, patterning is performed in a matrix shape matching a non-pixel portion by etching. An electrode substrate is produced by conducting an alignment treatment after the patterning. On the other hand, an alignment treatment is performed to a substrate on which pixel electrodes, an electrical insulating film and an alignment film are formed in this order to obtain a counter substrate.

The electrode substrate and the counter substrate are attached to each other with a cell gap of 6 µm. Then, a mixture of a polymerization precursor and a liquid crystal material forming a liquid crystal layer is vacuum-injected between the electrode substrate and the counter substrate. Subsequently, the injection opening is sealed with a sealant (e.g., an epoxy resin), so as to obtain a liquid crystal cell.

The obtained liquid crystal cell is heated to a temperature at which the mixture exhibits a uniform isotropic phase. The heating temperature can be varied depending on the types of the polymerization precursor and the liquid crystal material, but preferably 80° C. to 110° C., and more preferably 90° C. to 100° C.

Next, the liquid crystal cell is slowly cooled to a temperature at which phase separation is caused in the mixture, and a temperature in the vicinity of the temperature is maintained. Finally, the liquid crystal cell is quickly cooled so as to cause a clear phase separation between the liquid crystal material and the polymerization precursor, and allow the molecules of the mixture to be entirely aligned in the liquid crystal phase. A specific example of the temperature setting is as follows: The liquid crystal cell is slowly cooled to a temperature of 70° C. The cooling rate is preferably 5° to 10° C./hr. A part of the molecules (substantially, the molecules of the liquid crystal material) in the cell come to exhibit the liquid crystal phase by this cooling. Next, when the liquid crystal cell is left at 60° C., the liquid crystal phase concentrate on the central area of the pixels, and the isotropic phase concentrates on peripheral areas of the pixels. Further, when the liquid crystal cell is slowly cooled, the liquid crystal phase nearly matches the pixel portion. At this point, when the liquid crystal cell is cooled to a temperature of −20° C., all the molecules are aligned in the liquid crystal phase.

Further, when the liquid crystal cell is irradiated with UV rays, the liquid crystal phase in the nonpixel portions (i.e., polymerization precursor) is polymerized so as to form a liquid crystal layer and a polymeric layer which are distinctly phase-separated. The illuminance of the UV rays is preferably 5 to 12 mW/cm$^2$, and the radiation time is preferably 4 to 12 minutes. The UV rays can be radiated entirely to the liquid crystal cell, or selectively radiated to a desired portion of the liquid crystal cell. Examples of the method for selectively radiating the UV rays include a method using a photomask, and a self alignment method allowing pixel electrodes themselves to work as a mask.

Preferably, the obtained liquid crystal cell is heated again to a temperature at which the mixture exhibits the uniform isotropic phase, and then slowly cooled to room temperature, so that the liquid crystal cell having a more satisfactory alignment state can be obtained.

Finally, polarizing plates are disposed outside the liquid crystal cell, and a reflecting plate is further disposed outside one of the polarizing plates, so as to obtain a liquid crystal display device.

A mechanism for forming a liquid crystal layer and a polymeric layer only by phase separation between a polymerization precursor and a liquid crystal material will be described.

A surface energy is varied by a surface treatment to a substrate (for example, by forming a surface improving layer on the substrate). Moreover, the surface energy can be controlled by suitably selecting a method for the surface treatment (for example, a material for the surface improving layer and a forming method thereof).

Thus, by controlling the surface energy on the substrate, a liquid crystal layer and a polymeric layer can be formed only by phase separation between a liquid crystal material and a polymerization precursor (preferably, including a liquid crystalline polymerization precursor and a non-liquid crystalline polymerization precursor). Hereinafter, for the sake of simplicity, the case where an acrylic type resist is used for the surface improving layer, and an acrylate type polymerization precursor is used for the non-liquid crystalline polymerization precursor will be described.

When a liquid crystal cell in which a mixture of a polymerization precursor and a liquid crystal material is injected between substrates is cooled from a temperature at which the mixture exhibits a uniform isotropic phase to a temperature at which the mixture exhibits the two-phase region of the isotropic phase and the liquid crystal phase, the acrylate type polymerization precursor is easy to concentrate in a resist-formed portion on the substrates, because the acrylate type polymerization precursor is excellent in wettability with respect to the acrylic type resist. As a result, a concentration gradient is generated, matching a pattern of the resist (i.e. acrylate concentrates in the resist-formed portion and exhibits the isotropic phase, and the liquid crystal material and the liquid crystalline polymerization precursor concentrate in the non-resist-formed portion and exhibits the liquid crystal phase). Further, since the liquid crystalline polymerization precursor is similar to the acrylate type polymerization precursor in their molecule structures, the liquid crystalline polymerization precursor moves to the isotropic phase (i.e., acrylate type polymerization precursor). By suitably controlling the temperature in accordance with a used material, the mixture is divided into the liquid crystal phase substantially constituted by the liquid crystal material and the isotropic phase substantially constituted by the polymerization precursor. At this point, when the liquid crystal cell is quickly cooled, the isotropic phase is changed into the liquid crystal phase so as to allow all the molecules to be in the liquid crystal phase, without allowing the molecules in liquid crystal phase and the isotropic phase to move. Namely, a liquid crystal layer and a portion formed of substantially liquid crystalline polymerization precursors which are aligned in a desired state are formed. The polymerization of the polymerization precursor is caused in the same mechanism as in Embodiment 1. As a result, a polymeric layer of a desired alignment state is formed.

Since the polymeric layer formed as described above can have birefringence in the same alignment state as the liquid crystal layer, the transmittance of the polymeric layer is very close to that of the liquid crystal layer. Accordingly, the liquid crystal display device becomes bright as a whole.

Embodiment 4

Figure 6:
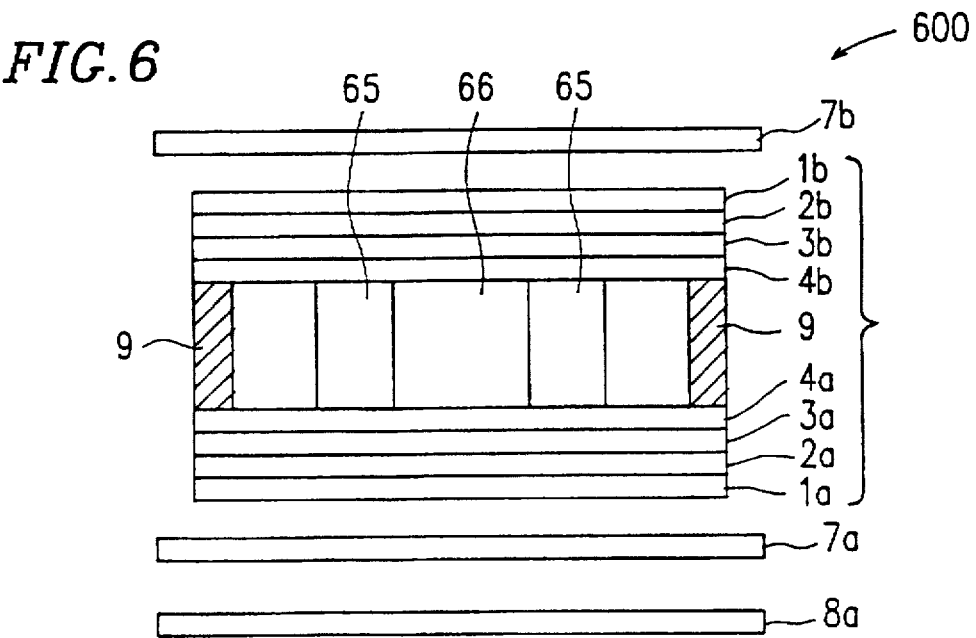
FIG. 6 is a schematic cross sectional view showing yet another example of the liquid crystal display device according to the present invention.

FIG. 6 is a schematic cross sectional view showing still another example of a liquid crystal display device according to the present invention. In a liquid crystal display device 600, a polymerization precursor forming a polymeric layer 65 contains a component having negative dielectric anisotropy, and the polymerization precursor as a whole has the negative dielectric anisotropy.

In the present specification, the wording, "positive dielectric anisotropy" implies that molecules are aligned in the direction along electric field when the electric field is applied. The wording, "negative dielectric anisotropy" implies that molecules are aligned in the direction perpendicular to electric field when the electric field is applied. The wording, "positive dielectric anisotropy as a whole" implies that the dielectric anisotropy of the mixture is dominated by the material having positive dielectric anisotropy contained in the mixture.

A liquid crystal material generally used for forming a liquid crystal layer is a material having positive dielectric anisotropy. Examples of a material having negative dielectric anisotropy include compounds represented by the following formulae. Preferably, 50 to 90 parts by weight of such a compound are contained in 100 parts by weight of the polymerization precursor.

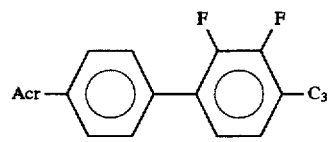

Preferably, the mixture of the polymerization precursor and the liquid crystal material forming a liquid crystal layer 66 exhibits the two-phase region of liquid crystal phase and isotropic phase at temperatures in the range from 10° C. to 70° C., and the mixture has positive dielectric anisotropy as a whole.

Preferably, in order to cause a clearer phase separation from the liquid crystal material, a non-liquid crystalline polymerization precursor can be contained in the polymerization precursor within the range where a desired dielectric anisotropy is maintained.

In such a liquid crystal display device 600, the liquid crystal layer and the polymeric layer can be formed only by phase separation between the polymerization precursor and the liquid crystal material, without previously forming the polymeric layer or conducting a surface treatment to the substrate. The phase separation between the polymerization precursor and the liquid crystal material in this embodiment will be described below.

When an electric field is applied at a temperature at which the mixture of the polymerization precursor and the liquid crystal material exhibits the two-phase region of liquid crystal phase and isotropic phase, since the liquid crystal phase has positive dielectric anisotropy as a whole, molecules in the liquid crystal phase (molecules of the liquid crystal material and molecules of the polymerization precursor) are aligned in the direction along the electric field (the perpendicular direction). Since the molecules of the polymerization precursor having negative dielectric anisotropy are aligned in the direction along the electric field against its own dielectric anisotropy, they are energetically unstable in such a state. Therefore, the molecules of the polymerization precursor move to the isotropic phase in which they are energetically stable. As a result, the molecules of the liquid crystal material concentrate in a portion where the electric field is applied (i.e., pixel portion), and the molecules of the polymerization precursor having negative dielectric anisotropy concentrate in a portion where the electric field is not applied (i.e., non-pixel portion). The mechanism of subsequent polymerization is the same as described above. As a result, the liquid crystal layer and the polymeric layer can be formed only by phase separation between the polymerization precursor and the liquid crystal material, without previously forming the polymeric layer or conducting a surface treatment to the substrate.

Embodiment 5

In any of the aforementioned Embodiments 1 to 4, it is preferred that a birefringence $\Delta n_1$ of the polymerization precursor substantially matches a birefringence $\Delta n_2$ of the liquid crystal material forming the liquid crystal layer. (Herein, the "polymerization precursor" includes a liquid crystalline polymerization precursor, and a polymerization precursor containing a liquid crystalline polymerization precursor and a non-liquid crystalline polymerization precursor.)

More specifically, the difference between the birefringence $\Delta n_1$ of the polymerization precursor and the birefringence $\Delta n_2$ of the liquid crystal material forming the liquid crystal layer is preferably less than ±15% of the birefringence $\Delta n_2$. That results in a smaller difference between the birefringence of the liquid crystal layer and that of the polymeric layer, thereby obtaining a brighter liquid crystal display device.

For example, in the case where the polymeric layer is previously formed from the liquid crystalline polymerization precursor, as in Embodiment 1, the birefringence of the polymeric layer and the birefringence of the liquid crystal layer can be relatively easily adjusted by adjusting the birefringence $\Delta n_1$ of the liquid crystalline polymerization precursor and the birefringence $\Delta n_2$ of the liquid crystal material forming the liquid crystal layer.

For example, in the case where phase separation between the liquid crystal material and the polymerization precursor is caused, as in Embodiment 3, it is important to reduce the difference between the birefringence $\Delta n_1$ of the polymerization precursor and the birefringence $\Delta n_2$ of the liquid crystal material forming the liquid crystal layer. This case will be described below.

Although complete phase separation between the liquid crystal material and the polymerization precursor is ideal, it is extremely difficult to attain the complete phase separation. For this reason, there is a possibility that a trace of polymerization precursor remains in the liquid crystal layer (herein, "a trace of" refers to an amount so small that a responding rate and an alignment state of the liquid crystal are not substantially changed). An average value of birefringences of a plurality of compounds is taken as the value for the birefringence of the mixture of the compounds (e.g., liquid crystal material and polymerization precursor). Accordingly, in the case where the difference between the birefringence $\Delta n_2$ of the liquid crystal material and the birefringence $\Delta n_1$ of the polymerization precursor is great, it is extremely difficult to control the birefringence of the liquid crystal layer to be formed. When the difference between the birefringence $\Delta n_1$ of the polymerization precursor and the birefringence $\Delta n_2$ of the liquid crystal material forming the liquid crystal layer is less than ±15% of the birefringence $\Delta n_2$, the birefringence of the liquid crystal layer to be formed can be easily controlled so as to be a desired value, even if the phase separation between the liquid crystal material and the polymerization precursor is not complete. As a result, tone of an obtained liquid crystal display device can be kept constant. Further, even if the degrees of the phase separation between the liquid crystal material and the polymerization precursor are slightly different, the tone of the liquid crystal display device as a whole is not substantially influenced. Thus, the reproducibility of the tone of the liquid crystal display device is significantly improved.

Herein, in the case where the polymerization precursor is a mixture of a plurality of compounds, the difference between the birefringence of each of the compounds and the birefringence $\Delta n_2$ of the liquid crystal material is preferably less than ±15% of the birefringence of each of the compounds. For example, in the case where the polymerization precursor is a mixture of a compound having a birefringence of substantially nil and a compound having a birefringence substantially equal to that of the liquid crystal material, the birefringence of the polymerization precursor as a whole is substantially equal to that of liquid crystal material. However, in the case where the compound having a birefringence of substantially nil is left in a large amount, it may be difficult to control the birefringence of the liquid crystal layer. Therefore, in the case where the polymerization precursor is a mixture of a plurality of compounds, it is preferred that the difference between the birefringence of each of the compounds and the birefringence $\Delta n_2$ of the liquid crystal material is reduced as much as possible.

The case where phase separation between the liquid crystal material and the polymerization precursor will be described by way of specific values of the birefringence. For example, in an STN display mode, an acceptable range of accuracy of a cell gap (i.e., acceptable range within which a uniform tone can be obtained) is (cell gap) ±0.05 (µm). When the cell gap is 6 µm, and the birefringence of the liquid crystal layer $\Delta n$ is 0.1, the range of the birefringence $\Delta n$ of the liquid crystal layer corresponding to such an acceptable range of the cell gap accuracy satisfies the following inequality:

$$0.09917 < \Delta n < 0.10083.$$

On the other hand, assuming that the birefringence $\Delta n_2$ of the liquid crystal material is 0.1, the birefringence $\Delta n_1$ of the polymerization precursor is 0.115, which is obtained as a result of multiplying the birefringence of the liquid crystal material by 1.15, and 5% of the polymerization precursor is left in the liquid crystal layer after the phase separation between the liquid crystal material and the polymerization precursor, the birefringence $\Delta n$ of the liquid crystal layer becomes 0.10075. This is within the acceptable range of the birefringence of the liquid crystal layer in which a uniform tone can be obtained. Thus, by setting the difference between the birefringence $\Delta n_1$ of the polymerization precursor and the birefringence $\Delta n_2$ of the liquid crystal material forming the liquid crystal layer to be less than ±15% of the birefringence $\Delta n_2$, a liquid crystal display device having an excellent reproducibility of the tone can be obtained.

Phase Separation between Liquid Crystal Material and Polymerization Precursor

Figure 7A:
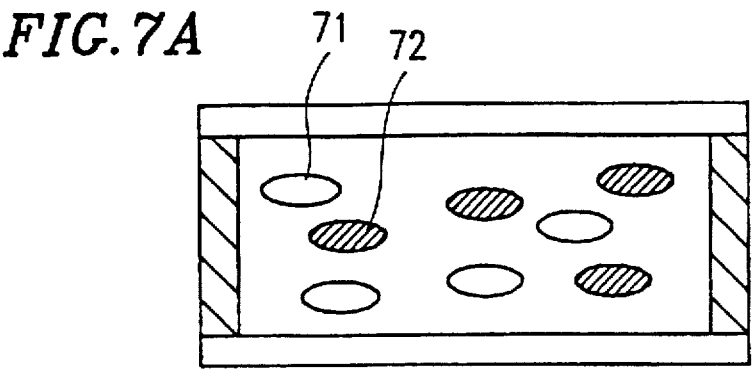
FIG. 7A is a schematic view illustrating phase separation between a liquid crystal material and a polymerization precursor, showing that the phase separation between the liquid crystal material and the liquid crystalline polymerization precursor is difficult.
Figure 7B:
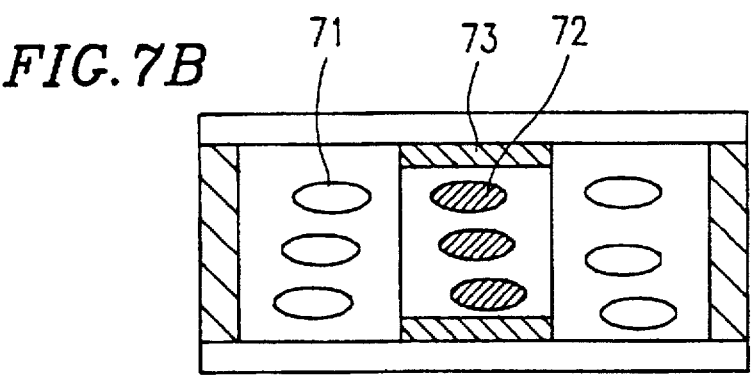
FIG. 7B is a schematic view illustrating phase separation between a liquid crystal material and a polymerization precursor, showing that the phase separation between the liquid crystal material and the polymerization precursor is caused by a surface treatment to a substrate.
Figure 7C:
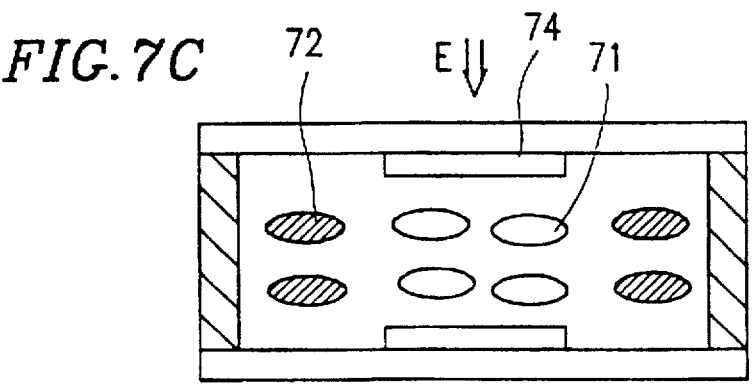
FIG. 7C is a schematic view illustrating phase separation between a liquid crystal material and a polymerization precursor, showing that the phase separation between the liquid crystal material and the polymerization precursor is caused by applying an electric field to the liquid crystal material and the polymerization precursor having different dielectric anisotropy from each other.

Phase separation between a liquid crystal material and a polymerization precursor will be briefly described. FIGS. 7A through 7C are schematic views illustrating the phase separation between the liquid crystal material and the polymerization precursor. FIG. 7A is a schematic view showing that the phase separation between the liquid crystal material and the liquid crystalline polymerization precursor is difficult. FIG. 7B is a schematic view showing that the phase separation between the liquid crystal material and the polymerization precursor is caused by a surface treatment to a substrate. FIG. 7C is a schematic view showing that the phase separation between the liquid crystal material and the polymerization precursor is caused by applying an electric field to the liquid crystal material and the polymerization precursor having different dielectric anisotropy from each other.

As shown in FIG. 7A, since a liquid crystal material 71 and a liquid crystalline polymerization precursor 72 have an excellent compatibility with each other, it is generally difficult to cause phase separation. Therefore, in one embodiment of the present invention, a polymeric layer is first formed on a substrate, and then a liquid crystal material is disposed to obtain a liquid crystal display device (Embodiment 1).

As shown in FIG. 7B, a substrate is subjected to a surface treatment (for example, a thin film having a surface energy different from that of the surface of the substrate is formed on a predetermined portion of the substrate), so that a polymerization precursor 72 concentrates in a portion 73 which has been subjected to the surface treatment. Thus, the phase separation between the liquid crystal material 71 and the polymerization precursor 72 can be effected. As a result, a process for producing a liquid crystal display device can be simplified (Embodiment 3).

Further, as shown in FIG. 7C, an electric field is applied to a liquid crystal material and a polymerization precursor having different dielectric anisotropy from each other, so as to cause the phase separation between the liquid crystal material and the polymerization precursor. More specifically, the liquid crystal material 71 concentrate to the electric field applied portion 74, and the polymerization precursor 72 concentrates in a portion where the electric field is not applied. As a result, a process for producing a liquid crystal display device can be further simplified (Embodiment 4).

EXAMPLES

Hereinafter, the present invention will be specifically described by way of examples. However, the present invention is not limited to these examples. Parts and % shown in Examples were referred to by the standard of weight, if other standards were not specifically mentioned.

EXAMPLE 1

An ITO film was formed to a thickness of 2000 Å on a glass substrate by sputtering, and processed by photolithography, so as to form striped pixel electrodes. Next, an electrical insulating film made of $SiO_2$ was formed to a thickness of 500 Å by sputtering so as to cover the pixel electrodes. Further, an alignment film made of a polyimide resin was formed to a thickness of 700 Å by flexography. A rubbing treatment to the surface of the alignment film was conducted using a nylon fabric so that molecules of the liquid crystal layer were aligned in a TN orientation. In such a manner, an electrode substrate was obtained. On the other hand, an alignment film alone was formed on a glass substrate to obtain a substrate for UV ray radiation.

Next, a composition C-1 shown in Table 1 below, was disposed on the electrode substrate by a casting method so as to work as the liquid crystalline polymerization precursor. The electrode substrate and the substrate for UV radiation were attached to each other via spacers having a diameter of 5 μm, so that the directions of the alignment treatments of the alignment films were perpendicular to each other. A matrix-shaped metal photomask matching a pattern of the pixel electrodes was disposed outside the substrate for UV ray radiation. Then, UV rays were radiated via the photomask at an illuminance of 10 mW/cm$^2$ for 60 seconds. After the radiation, the substrate for UV ray radiation was peeled off from the electrode substrate, and the surface of the electrode substrate was cleaned with ethanol for 30 seconds. In this manner, a polymeric layer was formed on the electrode substrate.

TABLE 1

| Liquid crystalline polymerization precursor | A | B | C | Chiral agent | Tni | Δn | Pitch |
|---|---|---|---|---|---|---|---|
| Composition C-1 | 10 | 40 | 50 | 0 | 44° C. | 0.148 | — |
| Composition C-2 | 10 | 40 | 50 | 0.3 | 44° C. | 0.148 | 20 μm |
| Composition C-3 | 10 | 40 | 50 | 0.5 | 44° C. | 0.148 | 12 μm |

(Parts of weight)

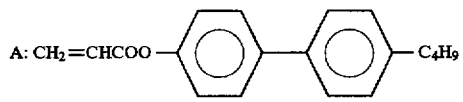

A: $CH_2=CHCOO$—⟨⟩—⟨⟩—$C_4H_9$

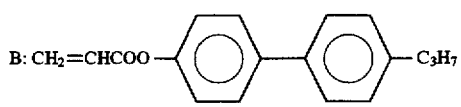

B: $CH_2=CHCOO$—⟨⟩—⟨⟩—$C_3H_7$

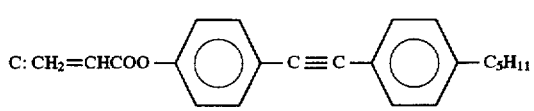

C: $CH_2=CHCOO$—⟨⟩—$C≡C$—⟨⟩—$C_5H_{11}$ ( Tni: Transition temperature
  Δn: Birefringence )

Next, a liquid crystal material (manufactured by Merck & Co., Inc., ZLI-4427) to which a chiral agent S-811 was added was disposed on the electrode substrate on which the polymeric layer was formed. The chiral agent S-811 was added so that the molecules of the liquid crystal material were aligned at a predetermined pitch and at a twist angle of 240°. Then, evacuation was effected to reach a vacuum. The electrode substrate on which the liquid crystal material was disposed and a counter substrate on which pixel electrodes, an electrical insulating film and an alignment film were formed in this order were attached to each other and sealed via a sealant so that the pixel electrodes were perpendicular to each other, viewed from the normal direction with respect to the substrate. Thus, a liquid crystal cell was obtained. Finally, polarizing plates were disposed outside the liquid crystal cell, and a reflecting plate was disposed outside one of the polarizing plates. Thus, a liquid crystal display device was obtained.

An alternating current field of voltage 10 V and frequency 60 Hz was applied to the liquid crystal display device. Then, brightness of the liquid crystal display device was measured. As a result, it was found that the non-pixel portion was not dark, unlike a conventional liquid crystal display device, and the obtained liquid crystal display device was bright as a whole.

Comparative Example 1

A liquid crystal display device was produced in the same manner as in Example 1, except that a polymeric layer was formed with a non-liquid crystalline polymerization precursor. Then, brightness of the liquid crystal display device was measured, as in Example 1.

As a result, the non-pixel portion where the polymeric layer was formed was dark, and the liquid crystal display device was not bright as a whole. This liquid crystal display device transmits as small as 80% of the light which was transmitted through the device in Example 1.

Comparative Example 2

An attempt was made to produce a liquid crystal display device in the same manner as in Example 1, except that UV rays were radiated after the mixture of the liquid crystal material and the liquid crystalline polymerization precursor was injected between the substrates. However, the phase separation between the liquid crystal material and the liquid crystalline polymerization precursor was not caused. This fact shows that it was difficult to cause the phase separation between the liquid crystal material and the liquid crystalline polymerization precursor by an ordinary method.

EXAMPLE 2

A liquid crystal display device was produced in the same manner as in Example 1, except that a composition C-2 shown in Table 1 instead of the composition C-1 was used as the liquid crystalline polymerization precursor, and that the substrate for UV ray radiation was subjected to a surface treatment with a release agent (manufactured by Ashahi Glass Co., Ltd., Saitop). As in Example 1, the brightness of the liquid crystal display device was measured. As a result, the liquid crystal display device was as bright as the device in Example 1.

EXAMPLE 3

A liquid crystal display device was produced in the same manner as in Example 1, except that a composition C-2 shown in Table 1 instead of the composition C-1 was used as the liquid crystalline polymerization precursor, and that the liquid crystalline polymerization precursor was printed in a matrix shape, and then polymerized. As in Example 1, the brightness of the liquid crystal display device was measured. As a result, the liquid crystal display device was as bright as the device in Example 1.

EXAMPLE 4

Two of the same electrode substrate as used in Example 1 were prepared. A composition C-3 shown in Table 1 was disposed on each of the electrode substrates by a casting method so as to work as the liquid crystalline polymerization precursor. The same substrate for UV ray radiation as used in Example 2 was attached to each of the electrode substrates via spacers of 3 microns. UV rays were radiated via a striped photomask at an illuminance of 10 mW/cm$^2$ for 40 seconds. After the radiation, the substrates for UV ray radiation were peeled off from the electrode substrates, and the surfaces of the electrode substrates were cleaned with ethanol for 30 seconds. In this manner, a pair of electrode substrates on which resin layers having an optical anisotropy were formed in a stripe shape matching a pattern of a portion where the pixel electrodes were not formed were produced. The pair of electrode substrates on which the resin layers having an optical anisotropy were formed in a stripe shape were attached to each other via spacers of 5 microns so that the resin layer on one of the substrates was perpendicular to the resin layer on the other substrate, viewed from the normal direction with respect to the substrates. (Namely, the substrates were attached to each other in a state where the portion on which resin layers overlap was crushed.) Next, a mixture of a liquid crystal material and a polymeric material was injected between the attached substrates to obtain a liquid crystal cell. The liquid crystal cell was heated to 100° C. Then, the liquid crystal cell was irradiated with UV rays at an illuminance of 5 mW/cm$^2$ for 180 seconds. Next, the liquid crystal cell was cooled at a cooling rate of 3° C./min. to cause phase separation between the liquid crystal material and the polymeric material. By this phase separation, a resin layer having no optical anisotropy was formed in a space between the resin layer having an optical anisotropy and the substrate, and a liquid crystal layer was formed in a pixel portion. As a result, the liquid crystal cell including a polymeric layer in which the resin layer having an optical anisotropy and the resin layer having no optical anisotropy were superposed, and the liquid crystal layer surrounded by the polymeric layer was produced. Subsequently, in the same manner as in Example 1, a liquid crystal display device was obtained. Then, the brightness of the obtained liquid crystal display device was measured. As a result, the liquid crystal display device was as bright as the device in Example 1. Further, when the liquid crystal display device was pressed with a flat pen point having a diameter of 1 mm, pressure resistance of the liquid crystal alignment was about 2.0 MPa, which was highly satisfactory.

EXAMPLE 5

A liquid crystal display device was produced in the same manner as in Example 1, except that a plastic substrate instead of a glass substrate was used. As in Example 1, the brightness of the liquid crystal display device was measured. As a result, the liquid crystal display device was as bright as the device in Example 1. Further, when the liquid crystal display device was pressed with a flat pen point having a diameter of 1 mm, the pressure resistance of the liquid crystal alignment was about 1.0 MPa, which was highly satisfactory.

Comparative Example 3

A liquid crystal display device was produce in the same manner as in Example 5, except that the polymeric layer was not formed. Then, as in Example 5, the pressure resistance was measured. As a result, the pressure resistance was as small as about 20 kPa.

EXAMPLE 6

A liquid crystal display device was produced in the same manner as in Example 4, except that a plastic substrate instead of a glass substrate was used. As in Example 4, the brightness of the liquid crystal display device was measured. As a result, the liquid crystal display device was as bright as the device in Example 4. Further, when the liquid crystal display device was pressed with a flat pen point having a diameter of 1 mm, the pressure resistance of the liquid crystal alignment was about 2.0 MPa, which was highly satisfactory.

EXAMPLE 7

Fifteen parts by weight of a polymerization precursor C-4 shown in Table 2 below were mixed with 85 parts by weight of a liquid crystal material (manufactured by Merck & Co., Inc., ZLI-4427). Further a chiral agent S-811 was added to the mixture so that molecules of the liquid crystal material were aligned at a twist angle of 240° and at the pitch which the liquid crystal material had when it was independently used.

TABLE 2

|  | D | E | F | G | H | Initiator |
|---|---|---|---|---|---|---|
| Composition C-4 | 40 | 40 | 0 | 10 | 10 | 0.5 |
| Composition C-5 | 50 | 50 | 0 | 0 | 0 | 0.5 |
| Composition C-6 | 20 | 0 | 50 | 10 | 20 | 0.5 |

(Parts of weight)

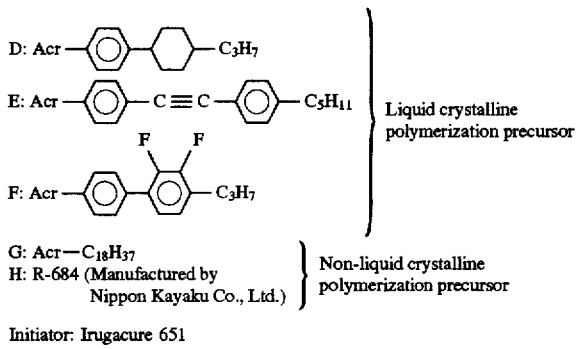

Initiator: Irugacure 651

On the other hand, in the same manner as in Example 1, pixel electrodes, an electrical insulating film and an alignment film were formed on a glass substrate. Further, an acrylic type resist material (manufactured by Tokyo Ohka Co., Ltd. OMR-83) was spin-coated to form a film having a thickness of 0.5 μm. The film was processed into a matrix shape matching a pattern of the non-pixel portion. Further, the substrate was subjected to a rubbing treatment to obtain an electrode substrate on which a surface treatment was conducted.

In order to obtain a counter substrate, pixel electrodes, an electrical insulating film and an alignment film were formed on a glass substrate in this order, and the resultant substrate was subjected to an ordinary rubbing treatment. The counter substrate and the electrode substrate were attached to each other so that the thickness was 6 μm and the twist angle was 240° C. The aforementioned mixture was injected by vacuum injection between the substrates, and the injection opening was sealed by an epoxy resin to obtain a liquid crystal cell.

This liquid crystal cell was heated to 100° C. in an oven in which the temperature was able to be controlled. Then, the liquid crystal cell was slowly cooled to 70° C. at a cooling rate of 6° C./h, so that the mixture partially exhibited the liquid crystal phase. The liquid crystal cell was left at 60° C., at which the liquid crystal phase occupies about a half of the area of the liquid crystal cell. Further, the liquid crystal cell was slowly cooled until the area exhibiting the liquid crystal phase was substantially equal to the area of the pixel portion. At the point where the area of the liquid crystal phase was substantially equal to the area of the pixel portion. The liquid crystal cell was quickly cooled to −20° C., so that all the molecules were aligned in the liquid crystal phase.

Further, the liquid crystal cell was irradiated with UV rays at an illuminance of 8 mW/cm² for 10 minutes, so as to polymerize the polymerization precursor in an area surrounding the pixels (i.e., non-pixel portion). Thus, a polymeric layer was formed. Further, after the liquid crystal cell was again heated to 100° C., the liquid crystal cell was slowly cooled to room temperature. Thus, a liquid crystal cell of a more satisfactory STM orientation was obtained.

Finally, polarizing plates were disposed outside the liquid crystal cell, and a reflecting plate was further disposed outside one of the polarizing plates. Thus, a liquid crystal display device was obtained.

An alternating current field of voltage 10 V and frequency 60 Hz was applied to the liquid crystal display device. Then, the brightness of the liquid crystal display device was measured. As a result, it was found out that the non-pixel portion was not dark, unlike a conventional liquid crystal display device, and the liquid crystal display device was bright as a whole.

Comparative Example 4

A liquid crystal cell was produced in the same manner as in Example 7, except that a composition C-5 shown in Table 2 instead of the composition C-4 was used as a polymerization precursor. As a result, phase separation between the liquid crystal material and the polymerization precursor was not caused. Further, when the liquid crystal cell was irradiated with UV rays via a mask, the polymerization of the polymerization precursor proceeds in an arbitrary in the liquid crystal cell. As a result, a polymer dispersed type liquid crystal cell was obtained. Therefore, a desired liquid crystal display device cannot be obtained.

This fact shows that in the case where a non-liquid crystalline polymerization precursor was not added, a mixture of a liquid crystal material and a liquid crystalline polymerization precursor was not satisfactorily phase-separated.

EXAMPLE 8

In the same manner as in Example 7 except that a composition C-6 shown in Table 2 instead of the composition C-4 was used as a polymerization precursor, a mixture of a liquid crystal material and the polymerization precursor were injected between substrates, so as to obtain a liquid crystal cell. When the liquid crystal cell was heated and slowly cooled, as in Example 7, the liquid crystal phase occupies about half of the area of the liquid crystal cell at a temperature of 50° C. At this point, when an alternating current of 60 Hz and 10 V was applied between the electrodes, the liquid crystal phase which existed at random concentrated on the electrode portion, and then the area exhibiting the liquid crystal phase was increased. At this point, the liquid crystal cell was quickly cooled to −20° C., so that all the molecules were aligned in the liquid crystal phase. Subsequently, in the same manner as in Example 7, a liquid crystal display device was obtained. Then, brightness of the obtained liquid crystal display device was measured. As a result, the liquid crystal display device was as bright as the device in Example 7.

EXAMPLE 9

The relations between a twist angle of the polymeric layer and brightness were examined.

A liquid crystal display device was produced in the same manner as in Example 1, except that the thickness was 3 microns. Further, by adjusting an amount of a chiral agent, liquid crystal display devices in which the twist angle of the polymeric layer was varied between 0° to 150° were produced. Then, the brightness of each liquid crystal display device was measured.

Figure 8:
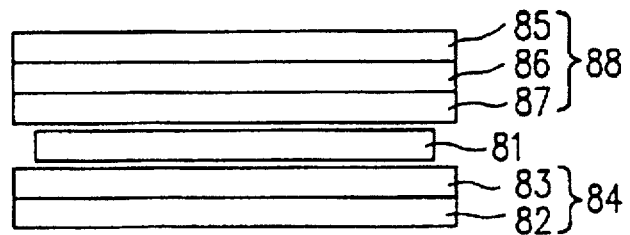
FIG. 8 is a schematic view showing upper components and lower components disposed both sides of a liquid crystal cell for measuring brightness in Examples 9 through 11.
Figure 9A:
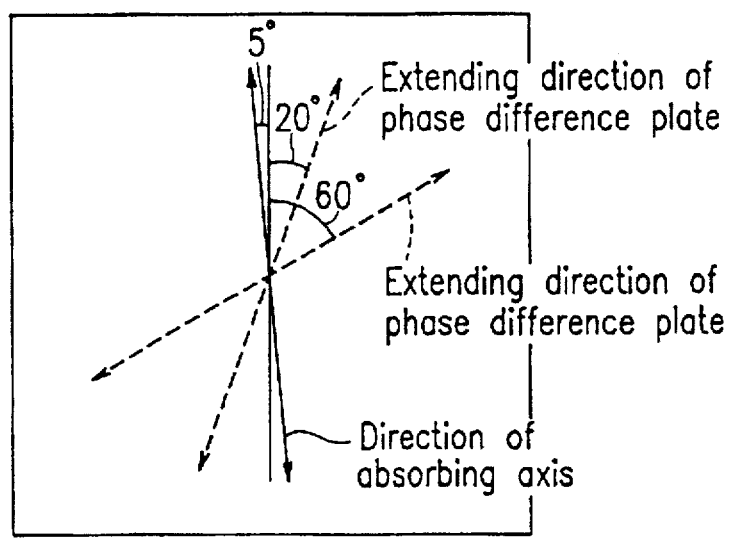
FIG. 9A is a diagram showing setting directions for the upper components shown in FIG. 8.
Figure 9B:
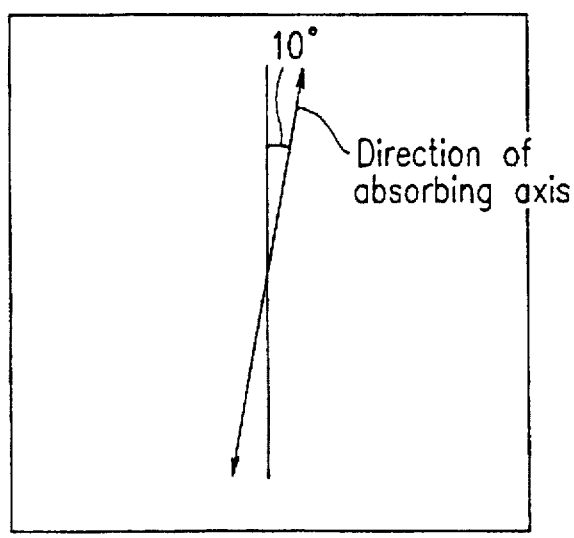
FIG. 9B is a diagram showing setting directions for the lower components shown in FIG. 8.

More specifically, the measurement of the brightness of the liquid crystal display devices (herein, liquid crystal cells) was conducted in the following procedures: As shown in FIG. 8, lower components 84 including a reflecting plate 82 and a polarizing plate 83 were provided on the lower face of an obtained liquid crystal cell 81. Upper components 88 including a polarizing plate 85 and phase difference plates 86 and 87 were provided on the upper face of the liquid crystal cell 81. The upper components 88 were set in such a direction, as shown in FIG. 9A, that an angle obtained by the direction of the absorbing axis of the polarizing plate 85 shown by the solid arrow with respect to the standard axis was 5°, and that an angle obtained by the extending direction of the phase difference plates 86 and 87 shown by the dotted arrow with respect to the standard axis were 20° and 60° C., respectively. The lower components 84 were set in such a direction, as shown in FIG. 9B, that an angle obtained by the direction of the absorbing axis of the polarizing plate 83 shown by the solid arrow with respect to the standard axis was 10°.

In this manner, by providing the reflecting plate 82, the brightness of a reflecting type liquid crystal display device was measured. The brightness was measured using a spectrometer (manufactured by Minolta Camera Co., Ltd., CM-1000), and evaluated by an L star (L*) value representing brightness and defined by a CIE system of color representation. The relations between the twist angle and the brightness of the polymeric layer (i.e., non-pixel portion) were shown in FIG. 10.

As apparent from the FIG. 10, the polymeric layer became brighter than the brightness (L*=40.8) of the liquid crystal layer (pixel portion) when a twist angle was 66° to 97°, and brightest when the twist angle was substantially 75°.

As described above, by setting the twist angle of the polymeric layer to be in the range of approximately 60° to 100°, the transmittance of the polymeric layer was equal to or more than that of the liquid crystal layer. Thus, the non-pixel portion can be brighter than the pixel portion. As a result, it was possible not only to prevent deterioration in the brightness of the liquid crystal display device due to the polymeric layer, but also to obtain a brighter liquid crystal display device than a liquid crystal display device having no polymeric layer.

EXAMPLE 10

In Example 10, a polymeric layer including a resin layer having an optical anisotropy and a resin layer having no optical anisotropy was measured.

A liquid crystal cell was produced in the same manner as in Example 4, except that a composition C-1 shown in Table 1 instead of the composition C-3 was used as a polymerization precursor, and that a chiral agent (S-811) was added so that a twist angle of a resin layer having an optical anisotropy was set at 75°.

When the brightness of the liquid crystal cell was measured in the same manner as in Example 9, it was found that a very bright liquid crystal cell (namely, liquid crystal display device) having an L*=38.9 was obtained.

EXAMPLE 11

A liquid crystal cell was produced in the same manner as in Example 10, except that the liquid crystal cell was produced by a producing method different from that in Example 10, and that the alignment state of the resin layer having an optical anisotropy was changed. Hereinafter, the production will be more specifically described.

A composition C-1 shown in Table 1 was cast on two substrates which had been subjected to a suitable alignment treatment. The pair of substrates were attached to each other via spacers of 3 μm. UV rays were radiated at an illuminance of 10 mW/cm² for 120 seconds via a photomask having a stripe shape matching a pattern of a portion where pixel electrodes were not formed. After the radiation, one of the substrates was peeled off, so as to produce a substrate on which a resin layer having an optical anisotropy was formed in a stripe shape matching the pattern of the portion where the pixel electrodes were not formed.

On the other hand, an electrode substrate was produced in the same manner as in Example 1. The electrode substrate and the substrate on which the resin layer having an optical anisotropy were attached to each other with pressure so that the pattern of the portion where the pixel electrodes were not formed matches the pattern of the resin layer having an optical anisotropy. Then, the attached substrates were subjected to a heating treatment at 70° C. for one hour, so as to transfer the resin layer having an optical anisotropy on the electrode substrate. Thus, the resin having an optical anisotropy was formed on the electrode substrate. Subsequently, a liquid crystal cell was produced in the same manner as in Example 4.

Figure 11A:
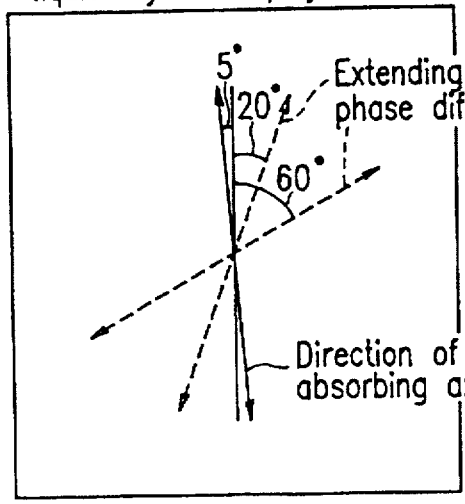
FIG. 11A is a diagram showing setting directions of upper components of a liquid crystal display device of Example 11.
Figure 11B:
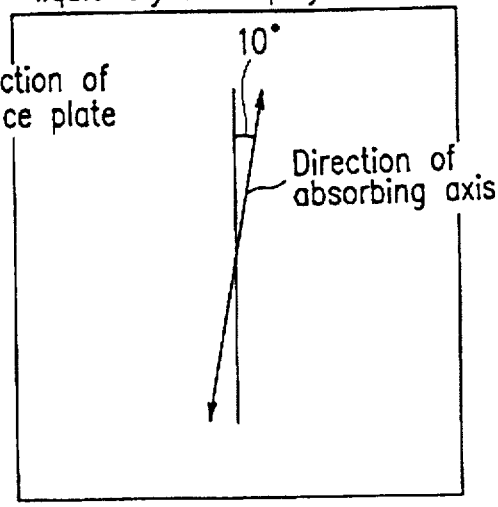
FIG. 11B is a diagram showing setting directions of lower components of the liquid crystal display device of Example 11.
Figure 11C:
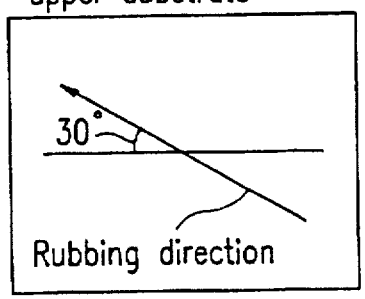
FIG. 11C is a diagram showing a rubbing direction for an upper substrate of the liquid crystal display device of Example 11.
Figure 11D:
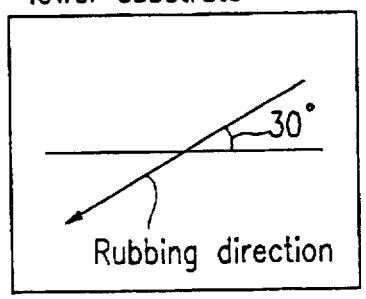
FIG. 11D is a diagram showing a rubbing direction for a lower substrate of the liquid crystal display device of Example 11.
Figure 11E:
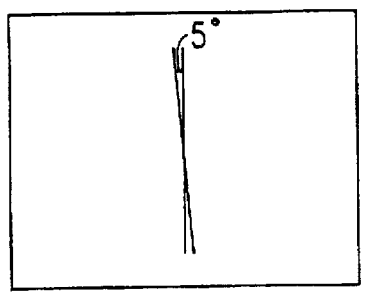
FIG. 11E is a diagram showing an alignment state of a resin layer having an optical anisotropy viewed from the upper substrate of the liquid crystal display device of Example 11.
Figure 11F:
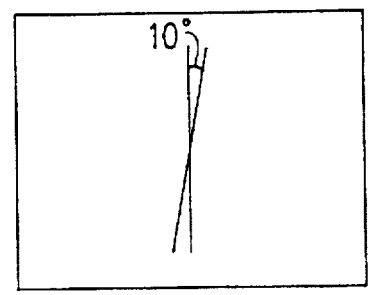
FIG. 11F is a diagram showing an alignment state of the resin layer having an optical anisotropy viewed from the lower substrate of the liquid crystal display device of Example 11.

Upper components consisting of a polarizing plate and two phase difference plates were disposed on the upper face of the obtained liquid crystal cell in the setting direction shown in FIG. 11A. Lower components consisting a polarizing plate and a reflecting plate were disposed on the lower face of the obtained liquid crystal cell in the setting direction shown in FIG. 11B. Rubbing treatments to the upper and lower substrates were performed so that rubbing directions were such as shown in FIGS. 11C and 11D, respectively, when viewed from the normal direction with respect to the substrate. FIGS. 11E and 11F show alignment states of the resin layer having an optical anisotropy of the reflecting type liquid crystal display device obtained as described above.

When the brightness of this liquid crystal display device was measured in the same manner as in Example 9, it was found out that a very bright liquid crystal display device having an L*=40.2 was obtained.

EXAMPLE 12

A pair of electrode substrates were produced in the same manner as in Example 1. This pair of electrode substrates were attached and sealed via a sealant so that the pixel electrodes were perpendicular to each other, viewed from the normal direction with respect to the substrates so as to obtain a liquid crystal cell. At this time, the cell gap was 6 μm.

On the other hand, a mixture of an STN liquid crystal material having a birefringence $\Delta n_2$ of 0.152 (manufactured by Merck & Co., Inc., MJ62690) and a polymerization precursor having a birefringence $\Delta n_1$ of 0.152 was prepared in the proportion of 80 to 20. Herein, the polymerization precursor was a mixture of compounds represented by the following formulae (I) and (II) (manufactured by Dainippon Ink and Chemicals Inc.) in the proportion of 50 to 50.

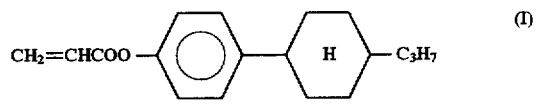
(I)

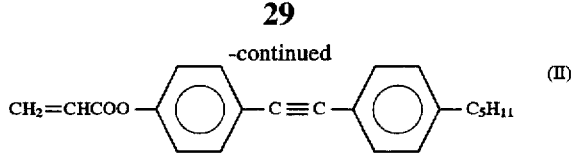

Then, 0.5 parts by weight of a photopolymerization initiator (manufactured by Ciba Geigy Corporation, Irugacure 651) was added to 100 parts by weight of the mixture of the liquid crystal material and the polymerization precursor, and the mixture was injected between the substrates attached in the same manner as in Example 1 by a known method, so as to obtain a liquid crystal cell. The obtained liquid crystal cell was irradiated with UV rays via a matrix shaped photomask at 2 mW/cm$^2$ for 10 minutes, so as to polymerize the polymerization precursor to some extent. Thus, a portion which is polymerized in a matrix shape to some extent (i.e., a polymeric layer which is partially formed in the matrix shape) was formed. Subsequently, a liquid crystal display device was produced in the same manner as in Example 7.

The brightness of the obtained liquid crystal display device was measured in the same manner as in Example 7. As a result, the non-pixel portion was not dark, unlike a conventional liquid crystal display device, and the obtained liquid crystal display device was bright as a whole. In addition, this liquid crystal display device was excellent in the reproducibility of tone.

Moreover, the liquid crystal display device was excellent in such characteristics as contrast and a responding rate in liquid crystal alone. It was also confirmed that the amount of the polymerization precursor which may be left in the liquid crystal layer was so small that reliability in the liquid crystal was not impaired. Namely, even if the polymerization precursor was left in the liquid crystal layer, a pretilt at the interface with the liquid crystal was not so changed that a desired responding rate could be obtained. Further, the alignment of the liquid crystal in this liquid crystal display device was satisfactory and stable in environment tests such as preservation at high temperature and at low temperature.

EXAMPLE 13

A liquid crystal display device was produced in the same manner as in Example 7, except that 10 parts by weight of a compound H shown in Table 2 is added to the composition C-1.

Since the compound H, which is a non-liquid crystalline polymerization precursor, had substantially no compatibility with the liquid crystalline polymerization precursor, the birefringence of the liquid crystal layer in the obtained liquid crystal display device was substantially the same as that of the liquid crystal material. Furthermore, the liquid crystal display device was bright and excellent in the reproducibility of tone. In this way, by adding a suitable amount of a compound which facilitates the phase separation between the liquid crystal material and the polymerization precursor, the liquid crystal display device was able to be obtained in a simpler manner without deteriorating the characteristics of the liquid crystal display device.

Comparative Example 6

A liquid crystal display device was produced in the same manner as in Example 12, except that an STN liquid crystal material having a birefringence $\Delta n_2$ of 0.1127 (manufactured by Merck & Co., Inc., ZLI-4427) was used as a liquid crystal material, and that a mixture of lauryl acrylate and adamantyl acrylate both having a birefringence $\Delta n_1$ of substantially nil in the proportion of 5 to 2 was used as a polymerization precursor.

The birefringence $\Delta n$ of the liquid crystal layer of this liquid crystal display device was 0.1068, which was very different from the birefringence $\Delta n_2=0.1127$ of the liquid crystal material. This fact shows that the birefringence of the liquid crystal layer was significantly changed by the polymerization precursor left in the liquid crystal layer. As described above, it was confirmed that the birefringence was changed to such an extent as to exceed the acceptable range in which a uniform tone can be obtained, and the reproducibility of the tone of the liquid crystal display device was not satisfactory.

According to the present invention, (1) a polymeric layer surrounding a liquid crystal layer is formed in a desired pattern by polymerizing a liquid crystalline polymerization precursor in a state where the molecules of the liquid crystalline polymerization precursor are aligned in a predetermined direction by an alignment regulating force of a substrate. The liquid crystalline polymerization precursor exhibits substantially the same characteristics as ordinary nematic liquid crystal. Therefore, in the liquid crystalline polymerization precursor before polymerization, the alignment of the molecules which is the same as the liquid crystal layer can be easily obtained by an alignment treatment to substrates. Moreover, the liquid crystalline polymerization precursor is polymerized while maintaining the alignment state of a portion exhibiting liquid crystallinity, because of its molecule structure. As a result, it is possible to easily form a polymeric layer having an optical anisotropy. In addition, since the polymeric layer can have a birefringence in the same alignment state as the liquid crystal layer, the transmittance of the polymeric layer becomes very close to that of the liquid crystal layer. For this reason, the non-pixel portion becomes as bright as the pixel portion. As a result, the liquid crystal display device as a whole becomes bright. In a reflecting type liquid crystal display device, in particular, the brightness is remarkable.

(2) The polymeric layer is a multilayer including a resin layer having an optical anisotropy and a resin layer having no optical anisotropy. The resin layer having no optical anisotropy is so rigid that the liquid crystal display device as a whole is excellent in rigidity, impact resistance and pressure resistance. Moreover, since the resin layer having an optical anisotropy and the resin layer having no optical anisotropy are superposed the brightness of the liquid crystal display device as a whole is kept satisfactory. Therefore, a bright liquid crystal display device having excellent impact resistance and pressure resistance can be obtained.

Further, the resin layer having an optical anisotropy of a thickness smaller than a cell gap is previously formed on at least one substrate. After the substrates are attached to each other, a mixture of a liquid crystal material and a resin material is injected. In this manner, a rigid polymeric layer is easily formed using an ordinary process for phase separation between the liquid crystal material and the resin material. As a result, it is prevented to increase the producing process and to require an operation which is complex and needs skills. Therefore, a bright liquid crystal display device having excellent impact resistance and pressure resistance can be easily produced.

Alternatively, the resin layer having an optical anisotropy previously formed on the other substrate is transferred on an electrode substrate. By such operation, it becomes possible to set a polymeric layer so as to be brightest, after the settings of polarizing plates, phase difference plates and the directions of alignment treatments are determined. This is because a twist angle suitable to the birefringence and the thickness of the polymeric layer is selected, and the twist angle can be set regardless of the direction of the alignment treatment to the device.

(3) In a preferred embodiment, the pattern of the polymeric layer is a matrix shape matching the pattern of the non-pixel portion. By doing this, incident light to the liquid crystal display device can be effectively utilized.

Alternatively, the pattern of the polymeric layer is a stripe shape matching the portion on the substrate where electrodes are not formed. The substrates are opposed and attached to each other so that the striped patterns are perpendicular to each other. By such an operation, it becomes possible to selectively radiate UV rays with the pixel electrodes themselves working as a mask, and to form a more accurate pattern matching the non-pixel portion.

(4) In a preferred embodiment, the molecules of the polymeric layer (or the resin layer having an optical anisotropy) are aligned at a twist angle of about 60° to about 100°. By allowing the molecules to be aligned at such a twist angle, the non-pixel portion becomes brighter than the pixel portion. As a result, the liquid crystal display device as a whole becomes bright. In a reflecting type panel, in particular, the brightness is remarkable.

(5) Alternatively, the substrates are subjected to a surface treatment in order to have portions each having different surface energy in a predetermined pattern. (For example, a surface improving layer is formed in a predetermined portion on the substrate.) By such an operation, it becomes possible to cause phase separation between the liquid crystal material and the liquid crystalline polymerization precursor, which has been conventionally difficult. As a result, a process of previously forming a polymeric layer on the substrate is not required any more, and the liquid crystal display device can be more easily produced.

In a preferred embodiment, a polymerization precursor includes a liquid crystalline polymerization precursor and a non-liquid crystalline polymerization precursor. This results in the more distinct phase separation between the liquid crystal material and the polymerization precursor.

In a preferred embodiment, a liquid crystal transition temperature of a polymerization precursor is lower than that of a liquid crystal material by at least 20° C. This results in the more distinct phase separation between the liquid crystal material and the polymerization precursor. Further, the mixture of the polymerization precursor and the liquid crystal material exhibits a two-phase region of liquid crystal phase and isotropic phase at temperatures in the range from 10° C. to 70° C. As a result, it becomes possible to cause the phase separation between the liquid crystal material and polymerization precursor in a wide range of the temperature.

(6) Alternatively, the polymerization precursor contains a component having a negative dielectric anisotropy, and has the negative dielectric anisotropy as a whole. Moreover, the mixture of the liquid crystal material and the polymerization precursor has a positive dielectric anisotropy as a whole. This makes it possible to cause the phase separation between the liquid crystal material and the liquid crystalline polymerization precursor, which has been conventionally difficult, without previously forming a polymeric layer on the substrate or conducting a surface treatment to the substrate. As a result, the process for producing the liquid crystal display device can be significantly simplified.

(7) Alternatively, a difference between a birefringence $\Delta n_1$ of a polymerization precursor and a birefringence $\Delta n_2$ of a liquid crystal material is less than ±15% of the birefringence $\Delta n_2$. By allowing the birefringences $\Delta n_1$ and $\Delta n_2$ to have such a relationship, even if the phase separation between the liquid crystal material and the polymerization precursor is not complete, the difference in the birefringence between the polymeric layer and the liquid crystal layer is reduced. Thus, a brighter liquid crystal display device can be obtained. Further, since the birefringence of the liquid crystal layer can be easily and accurately controlled, the reproducibility of tone of the liquid crystal display device is significantly improved. As a result, the yield of production of the liquid crystal display device is significantly improved.

(8) The liquid crystal display device of the present invention is suitably used in a plane display apparatus such as a personal computer, a liquid crystal TV apparatus, a portable display apparatus, and a device in which a display portion and an input portion are integrated by a pen input.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device including substrates opposed to each other, a polymeric layer patterned into a predetermined pattern, and a liquid crystal layer at least partially surrounded by the polymeric layer, the polymeric layer and the liquid crystal layer being interposed between the substrates, wherein the polymeric layer is at least partially formed by polymerizing a liquid crystalline polymerization precursor in a state where the molecules of the liquid crystalline polymerization precursor are aligned in a predetermined direction by an alignment regulating force of at least one of the substrates, wherein the difference between a birefringence $\Delta n_1$ of the liquid crystalline polymerization precursor and a birefringence $\Delta n_2$ of a liquid crystal material forming the liquid crystal layer is less than ±15% of the birefringence $\Delta n_2$.

2. A liquid crystal display device according to claim 1, wherein the predetermined pattern is a matrix shape.

3. A liquid crystal display device including substrates opposed to each other, a polymeric layer patterned into a predetermined pattern, and a liquid crystal layer at least partially surrounded by the polymeric layer, the polymeric layer and the liquid crystal layer being interposed between the substrates, wherein the polymeric layer is at least partially formed by polymerizing a polymerization precursor in a state where the molecules of the polymerization precursor are aligned in a predetermined direction by an alignment regulating force of at least one of the substrates, and where the polymeric layer is patterned by a surface treatment which is formed on the substrates.

4. A liquid crystal display device according to claim 3, wherein the surface treatment is performed by forming a thin film having surface energy different from the substrate surface on the surface of the substrate in accordance with a pattern of electrodes formed on the substrate.

5. A liquid crystal display device according to claim 3, wherein the polymerization precursor contains a liquid crystalline polymerization precursor and a non-liquid crystalline polymerization precursor.

6. A liquid crystal display device according to claim 5, wherein a liquid crystal transition temperature of the polymerization precursor is lower by at least 20° C. than a transition temperature of a liquid crystal material forming the liquid crystal layer.

7. A liquid crystal display device according to claim 5, wherein a mixture of the polymerization precursor and a liquid crystal material forming the liquid crystal layer exhibits a two-phase region of liquid crystal phase and isotropic phase at temperatures in a range from 10° C. to 70° C.

8. A liquid crystal display device according to claim 5, wherein the non-liquid crystalline polymerization precursor is selected from the group consisting of an acrylate type polymerization precursor and a methacrylate type polymerization precursor.

9. A liquid crystal display device according to claim 5, wherein a difference between a birefringence $\Delta n_1$ of the polymerization precursor and a birefringence $\Delta n_2$ of a liquid crystal material forming the liquid crystal layer is less than ±15% of the birefringence $\Delta n_2$.

10. A method for producing a liquid crystal display device including substrates opposed to each other, a polymeric layer patterned into a predetermined pattern, and a liquid crystal layer at least partially surrounded by the polymeric layer, the polymeric layer and the liquid crystal layer being interposed between the substrates, the method comprising the steps of:

forming a thin film in a predetermined pattern on at least one of the substrates, the thin film having a surface energy different from the substrate surface;

injecting a mixture containing a liquid crystal material forming the liquid crystal layer and a polymerization precursor forming the polymeric layer between a pair of substrates on at least one of which the thin film is formed;

forming the liquid crystal layer by causing phase separation between the liquid crystal material and the polymerization precursor and by patterning the polymerization precursor with a pattern of the thin film; and forming the polymeric layer patterned into a predetermined pattern by polymerization the phase-separated polymerization precursor, in a state where the molecules of the polymerization precursor are aligned in a predetermined direction by an alignment regulating force of at least one of the substrates.

11. A liquid crystal display device including substrates opposed to each other, a polymeric layer patterned into a predetermined pattern, and a liquid crystal layer at least partially surrounded by the polymeric layer, the polymeric layer and the liquid crystal layer being interposed between the substrates, wherein the polymeric layer is at least partially formed by polymerizing a polymerization precursor, in a state where the molecules of the polymerization precursor are aligned in a predetermined direction by an alignment regulating force of at least one of the substrates, and the polymerization precursor includes at least a component having a negative dielectric anisotropy, and the polymerization precursor has the negative dielectric anisotropy as a whole.

12. A liquid crystal display device according to claim 11, wherein a mixture of the polymerization precursor and a liquid crystal material forming the liquid crystal layer exhibits a two-phase region of liquid crystal phase and isotropic phase at temperatures in a range from 10° C. to 70° C., and the mixture has a positive dielectric anisotropy as a whole.

13. A liquid crystal display device according to claim 11, wherein a difference between a birefringence $\Delta n_1$ of the polymerization precursor and a birefringence $\Delta n_2$ of a liquid crystal material forming the liquid crystal layer is less than ±15% of the birefringence $\Delta n_2$.

14. A method for producing a liquid crystal display device including substrates opposed to each other, a polymeric layer patterned into a predetermined pattern, and a liquid crystal layer at least partially surrounded by the polymeric layer, the polymeric layer and the liquid crystal layer being interposed between the substrates, the method comprising the steps of:

injecting a mixture between a pair of substrates on which electrodes are formed in a predetermined pattern, the mixture containing a liquid crystal material forming the liquid crystal layer and a polymerization precursor at least including a component having a negative dielectric anisotropy and having the negative dielectric anisotropy as a whole;

applying an electric field to the electrodes to cause phase separation between the liquid crystal material and the polymerization precursor in accordance with a pattern of the electrodes, so as to form the liquid crystal layer; and polymerizing the phase-separated polymerization precursor, in a state where the molecules of the polymerization precursor are aligned in a predetermined direction by an alignment regulating force of at least one of the substrates, so as to form the polymeric layer patterned into a predetermined pattern.

15. A liquid crystal display device including substrates opposed to each other, a polymeric layer patterned into a predetermined pattern, and a liquid crystal layer at least partially surrounded by the polymeric layer, the polymeric layer and the liquid crystal layer being interposed between the substrates, wherein the polymeric layer is at least partially formed by polymerizing a liquid crystalline polymerization precursor in a state where the molecules of the liquid crystalline polymerization precursor are aligned in a predetermined direction by an alignment regulating force of at least one of the substrates, wherein the difference between a birefringence $\Delta n_1$ of a mixture of compounds for the liquid crystalline polymerization precursor and a birefringence $\Delta n_2$ of a liquid crystal material forming the liquid crystal layer is less than ±15% of the birefringence $\Delta n_2$.

* * * * *